US008050714B2

(12) United States Patent
Fadell et al.

(10) Patent No.: US 8,050,714 B2
(45) Date of Patent: *Nov. 1, 2011

(54) DOCKING STATION FOR MEDIA PLAYER SYSTEM

(75) Inventors: Anthony M. Fadell, Portola Valley, CA (US); Stephen Paul Zadesky, Portola Valley, CA (US); John Benjamin Filson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 11/875,638

(22) Filed: Oct. 19, 2007

(65) Prior Publication Data

US 2008/0123285 A1 May 29, 2008

Related U.S. Application Data

(62) Division of application No. 10/423,490, filed on Apr. 25, 2003, now Pat. No. 7,627,343.

(51) Int. Cl.
*H04B 1/38* (2006.01)
*H04M 1/00* (2006.01)
(52) U.S. Cl. ...................... 455/557; 455/90.3; 455/556.1
(58) Field of Classification Search .................. 455/557, 455/556.1, 90.3; 710/64, 72, 300, 303; 439/218, 439/638, 639, 660, 49
See application file for complete search history.

(56) References Cited

U.S. PATENT DOCUMENTS 4,850,899 A 7/1989 Maynard
(Continued)

FOREIGN PATENT DOCUMENTS

DE 101 21 299 A1 1/2003
(Continued)

OTHER PUBLICATIONS

Sinitsyn, Alexander, "A Synchronization Framework for Personal Mobile Servers," *Pervasive Computing and Communications Workshops (PERCOMW'04).* Proceedings of the Second IEEE Annual Conference, Piscataway, NJ, USA, IEEE, Mar. 14, 2004, pp. 208-212.

(Continued)

*Primary Examiner* — George Eng
*Assistant Examiner* — Brandon Miller
(74) *Attorney, Agent, or Firm* — Kilpatrick Townsend & Stockton LLP

(57) ABSTRACT

A media player system is disclosed. One aspect of the media player system pertains to a docking station that allows a media player to communicate with other media devices. Another aspect of the media player system pertains to a wireless media player system that includes a hand held media player capable of transmitting information over a wireless connection and one or more media devices capable of receiving information over the wireless connection. Another aspect of the media player system pertains to a method of wirelessly connecting the hand held media player to another device. The method includes selecting a media item on the hand held media player; selecting one or more remote recipients on the hand held media player; and transmitting the media item locally to the hand held media player, and wirelessly to the selected remote recipients. Another aspect of the media player system pertains to a hand held music player that includes a transmitter for transmitting information over a wireless connection. The transmitter is configured to at least transmit a continuous music feed to one or more personal tuning devices that each include a receiver capable of receiving information from the transmitter over the wireless connection. Yet another aspect of the media player system pertains to a connector that includes a housing and a plurality of spatially separated contacts mounted within the housing. A first set of contacts are directed at a first functionality and a second set of contacts are directed at a second functionality that is different than the first functionality.

44 Claims, 16 Drawing Sheets

U.S. PATENT DOCUMENTS

| | | | |
|---|---|---|---|
| 4,874,316 A | 10/1989 | Kamon et al. |
| 4,972,470 A | 11/1990 | Farago |
| 5,055,069 A | 10/1991 | Townsend et al. |
| 5,077,552 A | 12/1991 | Abbate |
| 5,080,603 A | 1/1992 | Mouissie |
| 5,104,243 A | 4/1992 | Harding |
| 5,108,313 A | 4/1992 | Adams |
| D333,460 S | 2/1993 | Huang |
| 5,186,646 A | 2/1993 | Pederson |
| 5,277,624 A | 1/1994 | Champion |
| 5,357,608 A | 10/1994 | Bartow et al. |
| 5,379,057 A | 1/1995 | Clough et al. |
| 5,438,678 A | 8/1995 | Smith |
| 5,457,784 A | 10/1995 | Wells et al. |
| 5,568,525 A | 10/1996 | de Nijs et al. |
| 5,574,947 A | 11/1996 | Massa |
| 5,586,893 A | 12/1996 | Mosquera |
| 5,618,045 A | 4/1997 | Kagan et al. |
| 5,660,558 A | 8/1997 | Osanai et al. |
| 5,675,362 A | 10/1997 | Clough et al. |
| 5,737,364 A | 4/1998 | Cohen et al. |
| 5,830,001 A | 11/1998 | Kinoshita |
| 5,832,244 A | 11/1998 | Jolley |
| 5,901,049 A | 5/1999 | Schmidt et al. |
| 5,941,963 A | 8/1999 | Charles et al. |
| 5,975,957 A | 11/1999 | Noda et al. |
| 5,983,073 A | 11/1999 | Ditzik |
| 6,030,229 A | 2/2000 | Tsutsui |
| 6,053,773 A | 4/2000 | Wu |
| 6,073,201 A | 6/2000 | Jolley et al. |
| 6,154,798 A | 11/2000 | Lin et al. |
| 6,183,302 B1 | 2/2001 | Daikuhara et al. |
| 6,203,345 B1 | 3/2001 | Roque et al. |
| 6,206,480 B1 | 3/2001 | Thompson |
| 6,267,623 B1 | 7/2001 | Hisamatsu |
| 6,304,764 B1 | 10/2001 | Pan |
| 6,314,479 B1 | 11/2001 | Frederick et al. |
| 6,319,061 B1 | 11/2001 | Chen et al. |
| 6,322,396 B1 | 11/2001 | Kuan |
| 6,344,727 B1 | 2/2002 | Desai et al. |
| 6,353,169 B1 | 3/2002 | Juszkiewicz et al. |
| 6,354,713 B1 | 3/2002 | Leifer et al. |
| 6,431,915 B1 | 8/2002 | Ko |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,478,603 B1 | 11/2002 | Wu |
| 6,480,378 B2 | 11/2002 | Chang |
| 6,485,328 B1 | 11/2002 | Wu |
| 6,523,124 B1 | 2/2003 | Lunsford |
| 6,524,119 B2 | 2/2003 | Kato et al. |
| 6,549,401 B2 | 4/2003 | Lin et al. |
| 6,552,567 B1 | 4/2003 | Boles et al. |
| 6,561,815 B1 | 5/2003 | Schmidt |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,616,473 B2 | 9/2003 | Kamata et al. |
| 6,631,098 B2 | 10/2003 | Chang et al. |
| 6,633,932 B1 | 10/2003 | Bork et al. |
| 6,653,813 B2 | 11/2003 | Khatri |
| 6,658,516 B2 | 12/2003 | Yao |
| 6,663,420 B1 | 12/2003 | Xiao |
| 6,674,995 B1 | 1/2004 | Meyers et al. |
| 6,728,546 B1 | 4/2004 | Peterson et al. |
| 6,733,310 B2 | 5/2004 | Fujikura et al. |
| 6,754,468 B1 | 6/2004 | Sieben et al. |
| 6,776,626 B2 | 8/2004 | Huang et al. |
| 6,776,665 B2 | 8/2004 | Huang |
| 6,799,226 B1 | 9/2004 | Robbin et al. |
| 6,813,528 B1 | 11/2004 | Yang |
| 6,816,376 B2 | 11/2004 | Bright et al. |
| 6,856,506 B2 | 2/2005 | Doherty et al. |
| 6,859,854 B2 | 2/2005 | Kwong |
| 6,959,205 B2 | 10/2005 | Yambe |
| 6,973,516 B1 | 12/2005 | Athanas et al. |
| 6,988,897 B2 | 1/2006 | Belongia et al. |
| 6,991,483 B1 | 1/2006 | Milan et al. |
| 7,004,787 B2 | 2/2006 | Milan |
| 7,054,963 B2 | 5/2006 | Betts-LaCroix et al. |
| 7,110,755 B2 | 9/2006 | Shibasaki et al. |
| 7,293,122 B1 * | 11/2007 | Schubert et al. ............... 710/62 |
| 7,298,765 B2 | 11/2007 | Ganton et al. |
| 7,390,197 B2 | 6/2008 | Merz |
| 7,441,062 B2 | 10/2008 | Novotney et al. |
| 7,627,343 B2 * | 12/2009 | Fadell et al. ................ 455/557 |
| 7,632,114 B2 * | 12/2009 | Danner ....................... 439/131 |
| RE41,224 E | 4/2010 | Kubota et al. |
| 7,751,853 B2 * | 7/2010 | Fadell et al. ................ 455/557 |
| 7,783,070 B2 * | 8/2010 | Fadell et al. ................ 381/384 |
| 2002/0002035 A1 | 1/2002 | Sim et al. |
| 2002/0010759 A1 | 1/2002 | Hitson et al. |
| 2002/0029303 A1 | 3/2002 | Nguyen |
| 2002/0032042 A1 | 3/2002 | Poplawsky et al. |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0115480 A1 | 8/2002 | Huang |
| 2002/0132651 A1 | 9/2002 | Jinnouchi |
| 2002/0151327 A1 | 10/2002 | Levitt |
| 2002/0156546 A1 | 10/2002 | Ramaswamy |
| 2002/0163780 A1 * | 11/2002 | Christopher ................ 361/686 |
| 2002/0173273 A1 | 11/2002 | Spurgat et al. |
| 2002/0180803 A1 | 12/2002 | Kaplan et al. |
| 2003/0002395 A1 | 1/2003 | Chang et al. |
| 2003/0028664 A1 | 2/2003 | Tan et al. |
| 2003/0032333 A1 | 2/2003 | Kwong |
| 2003/0032419 A1 | 2/2003 | Shibasaki et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0097379 A1 | 5/2003 | Ireton |
| 2003/0172209 A1 | 9/2003 | Liu et al. |
| 2003/0198015 A1 | 10/2003 | Vogt |
| 2003/0218445 A1 | 11/2003 | Behar |
| 2003/0236075 A1 | 12/2003 | Johnson et al. |
| 2004/0039860 A1 | 2/2004 | Mills et al. |
| 2004/0048569 A1 | 3/2004 | Kawamura |
| 2004/0090998 A1 | 5/2004 | Chen |
| 2004/0151327 A1 | 8/2004 | Marlow |
| 2004/0162029 A1 | 8/2004 | Grady |
| 2004/0186935 A1 | 9/2004 | Bell et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0267825 A1 | 12/2004 | Novak et al. |
| 2005/0014536 A1 | 1/2005 | Grady |
| 2005/0239333 A1 | 10/2005 | Watanabe et al. |
| 2006/0154530 A1 | 7/2006 | Novotney et al. |
| 2006/0264114 A1 | 11/2006 | Novotney et al. |
| 2007/0161262 A1 | 7/2007 | Lloyd |
| 2007/0232098 A1 | 10/2007 | Danner |
| 2008/0125031 A1 | 5/2008 | Fadell et al. |
| 2009/0018682 A1 | 1/2009 | Fadell et al. |

FOREIGN PATENT DOCUMENTS

| | | |
|---|---|---|
| EP | 1 104 150 A2 | 5/2001 |
| EP | 1 168 770 A | 1/2002 |
| EP | 1 176 783 A2 | 1/2002 |
| GB | 2 362 237 A | 11/2001 |
| JP | H06-051881 A | 2/1994 |
| JP | 7-176351 A | 7/1995 |
| JP | H09-311993 A | 2/1997 |
| JP | H10-098512 | 4/1998 |
| JP | 10-321302 A | 12/1998 |
| JP | 10-334993 A | 12/1998 |
| JP | H11-288420 A | 10/1999 |
| JP | 2000-068006 A | 3/2000 |
| JP | 2000-214953 A | 8/2000 |
| JP | 2000-223215 A | 8/2000 |
| JP | 2000-223216 A | 8/2000 |

| | | | |
|---|---|---|---|
| JP | 2000-223218 A | 8/2000 |
| JP | 2001-35603 A | 2/2001 |
| JP | 2001-196133 A | 7/2001 |
| JP | 2001-230021 A | 8/2001 |
| JP | 2001-265360 A | 9/2001 |
| JP | 2001-306114 A | 11/2001 |
| JP | 2001-332350 A | 11/2001 |
| JP | 2002-25720 A | 1/2002 |
| JP | 2002-170643 A | 6/2002 |
| JP | 2002-203641 A | 7/2002 |
| JP | 2002-245719 A | 8/2002 |
| JP | 2002-252566 A | 9/2002 |
| JP | 2002-342659 A | 11/2002 |
| JP | 2002-374447 A | 12/2002 |
| JP | 3090747 U | 12/2002 |
| JP | 2003-15616 A | 1/2003 |
| JP | 2003-17165 A | 1/2003 |
| JP | 2003-31319 A | 1/2003 |
| JP | 2003-032351 A | 1/2003 |
| JP | 2003-092638 A | 3/2003 |
| JP | 2003-274386 A | 9/2003 |
| JP | 2004-531916 T | 10/2004 |
| KR | 2002-0015579 A | 2/2002 |
| WO | WO 00/60450 A1 | 10/2000 |
| WO | WO 01/13204 A | 2/2001 |
| WO | WO 01/17262 A1 | 3/2001 |
| WO | WO 01/62004 A1 | 8/2001 |
| WO | WO 02/43359 A2 | 5/2002 |
| WO | WO 02/49314 A2 | 6/2002 |
| WO | WO 02/075517 A2 | 9/2002 |
| WO | WO 02/087205 A1 | 10/2002 |
| WO | WO 02/103545 A2 | 12/2002 |
| WO | WO 2004/084413 A2 | 9/2004 |

OTHER PUBLICATIONS

International Search Report dated May 21, 2007 from PCT Application No. PCT/US2006/048670.

Derman, Glenda; "Monitors Make Net Connections"; 1996, *Electronic Engineering Times*, vol. 933, pp. 60 and 69.

Lewis, Peter; "On Technology"; 2002, *Fortune Magazine*, pp. 240.

"iPodDock/iPod Cradle"; www.bookendz/dock_cradle.htm, downloaded Feb. 27, 2003, 2 pages.

"Neuros MP3 Digital Audio Computer"; www.neurosaudio.com, downloaded Apr. 9, 2003, 6 pages.

Bindra, Ashok, "Standard Turns Monitor into I/O Hub," 1996, *Electronic Engineering Times*, vol. 918, p. 14.

Office Action and List of References Cited dated Feb. 27, 2007 issued in U.S. Appl. No. 10/423,490 (12 pages).

Office Action and List of References Cited dated Oct. 31, 2007 issued in U.S. Appl. No. 10/423,490 (16 pages).

Office Action and List of References Cited dated Nov. 14, 2008 issued in U.S. Appl. No. 10/423,490 (21pages).

Notice of Allowability and List of References Cited dated Jan. 29, 2009 from U.S. Appl. No. 12/238,278 (2 pages).

Office Action dated Sep. 18, 2008 issued in U.S. Appl. No. 11/394,459 (17 pages).

Supplementary European Search Report dated Mar. 14, 2008 issued in EP Application 04760202.

Search/Examination Report to European Patent Application No. 08019373.3 dated Apr. 6, 2009, 10 pages.

Search/Examination Report to European Patent Application No. 08019372.5 dated Feb. 9, 2009, 9 pages.

Monster iCruze for iPod Installation and User Guide; 2005, 18 pages.

International Search Report dated Aug. 20, 2004 from Application No. PCT/US04/008686 (WO 04/098079).

European Search Report dated Aug. 17, 2007 from EP Application No. 04760202.4.

Non-Final Office Action for U.S. Appl. No. 10/423,490; Dated on Sep. 2, 2004, 13 pages.

Non-Final Office Action for U.S. Appl. No. 10/423,490; Dated Apr. 21, 2005; 22 pages.

Non-Final Office Action for U.S. Appl. No. 10/423,490; Dated on Nov. 15, 2005; 24 pages.

Final Office Action for U.S. Appl. No. 10/423,490; Dated on May 8, 2006; 12 pages.

Final Office Action for U.S. Appl. No. 11/394,459; dated May 13, 2009; 26 pages.

Nokia, Quick Guide; Accessories Guide; 9357169; Issue 3 EN. (1999), 36 pages.

* cited by examiner

PIN DESIGNATION CHART

| Pin # | Signal name | I/O | Function |
|---|---|---|---|
| 1 | F/W GND | Input | Firewire and charger ground |
| 2 | F/W GND | Input | Firewire and charger ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | Input | USB power In, this is not used for powering, but to detect a connection to a USB host |
| 9 | TPB- | I/O | Firewire signal |
| 10 | Accessory Identify | Input | Pull down in dock to notify media player of specific device |
| 11 | F/W PWR+ | Input | Firewire and charger input power (8v to 30v dc) |
| 12 | F/W PWR+ | Input | Firewire and charger input power (8v to 30v dc) |
| 13 | ACCESSORY PWR(3V3) | Output | 3.3v output from media player, current limited to 100mA for powering accessories |
| 14 | Reserved | | |
| 15 | USB GND | GND | Digital ground in media player |
| 16 | DGND | GND | Digital ground in media player |
| 17 | Reserved | | |
| 18 | Dock Tx | | Serial protocol (Data To media player) |
| 19 | Dock Rx | | Serial protocol (Data From media player) |
| 20 | Accessory Detect | I/O | |
| 21 | Reserved | | |
| 22 | Reserved | | |
| 23 | Reserved | | |
| 24 | Reserved | | |
| 25 | LINE-IN L | Input | Line level input to the media player for the left channel |
| 26 | LINE-IN R | Input | Line level input to the media player for the right channel |
| 27 | LINE-OUT L | Output | Line level output to the media player for the left channel |
| 28 | LINE-OUT R | Output | Line level output to the media player for the right channel |
| 29 | Audio Return | GND | Audio return - Signal, never to be grounded inside accessory |
| 30 | DGND | GND | Digital ground in media player |
| 31 | Chassis | | Chassis ground for connector shell |
| 32 | Chassis | | Chassis ground for connector shell |

FIG. 6C

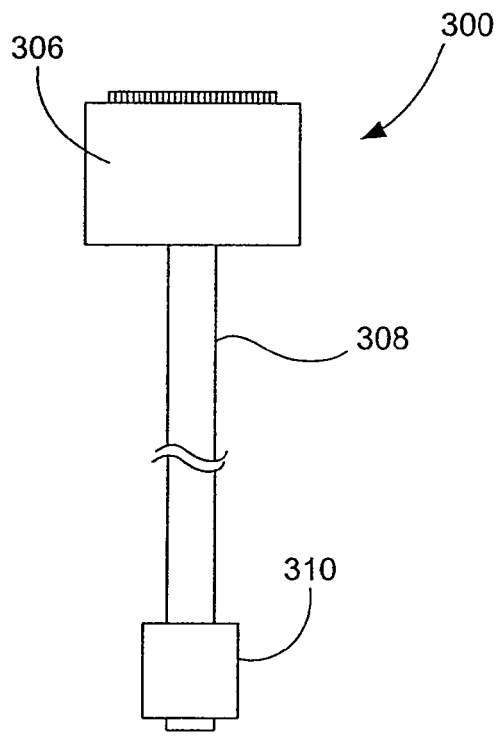
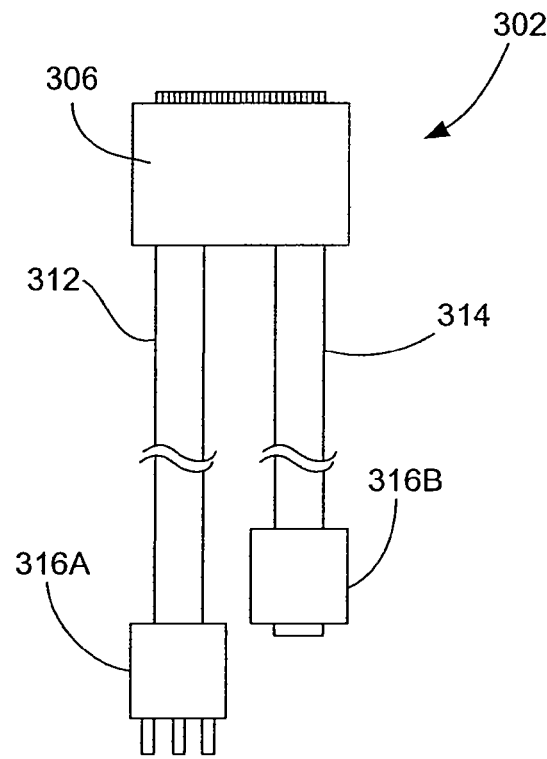
FIG. 9A
FIG. 9B
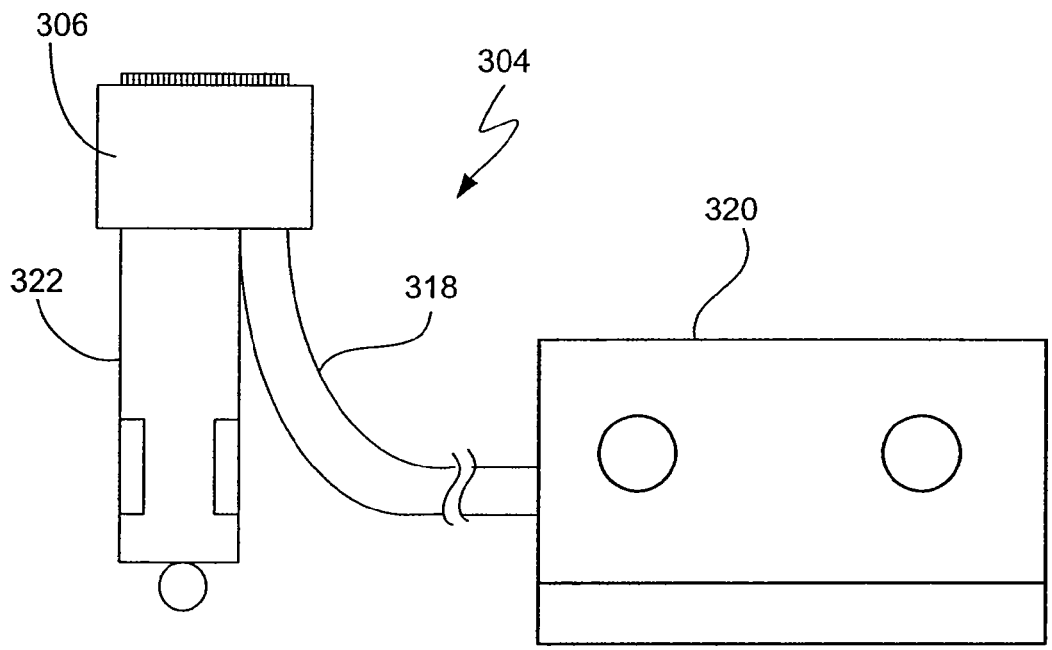
FIG. 9C

DOCKING STATION FOR MEDIA PLAYER SYSTEM

CROSS-REFERENCES TO RELATED APPLICATIONS

The present application is a division of U.S. patent application Ser. No. 10/423,490, filed Apr. 25, 2003, which is incorporated herein by reference for all purposes.

BACKGROUND OF THE INVENTION

1. Field of the Invention

The present invention relates generally to a media player. More particularly, the present invention relates to improved features for connecting the media player to external devices.

2. Description of the Related Art

The hand held consumer electronics market is exploding, and an increasing number of those products are including mechanism for expanding connections thereto. By way of example, hand held consumer electronic products may correspond to cellular phones, personal digital assistants (PDAs), video games, radios, MP3 players, CD players, DVD players, televisions, game players, cameras, etc. Most of these devices include some sort of connector for making connections to other devices (e.g., Firewire, USB, audio out, video in, etc.). Some of these devices have been capable of connections to other devices through docking stations. For example, cellular phones have included docking stations for charging the cellular phones and PDAs have included docking stations for communicating with a host computer. Other devices have been capable of wireless connections therebetween. For example, cellular phones use wireless connections to communicate back and forth (e.g., include wireless receivers).

MP3 music players in particular have typically made connections to other devices through connectors. For example, the MP3 music player known as the Ipod manufactured by Apple Computer of Cupertino, Calif. has included a Firewire connector for communicating with a computer. The Firewire connector through a cable connected to the computer generally allows data transmissions to travel back and forth between the MP3 music player and the computer. As should be appreciated, MP3 music players are configured to play MP3 formatted songs. These songs may be uploaded from the computer and thereafter stored in the MP3 player. As is generally well known, the MP3 format is a compression system for digital music that helps reduce the size of a digitized song without hurting the sound quality, i.e., compress a CD-quality song without losing the CD sound quality. By way of example, a 32 MB song on a CD may compress down to about a 3 MB song using the MP3 format. This generally lets a user download a song in minutes rather than hours.

Although current media players such as MP3 music players work well, there is a continuing need for improved features for connecting or coupling media players to one or more external devices (e.g., input or output).

SUMMARY OF THE INVENTION

The invention relates, in one embodiment, to a docking station that allows a media player to communicate with other media devices. The media player (e.g., music player) having a first media connector for connection to the docking station. The docking station includes a housing and a media bay disposed inside the housing. The media bay is capable of receiving the media player. The media bay includes a media bay opening and a second media connector. The media bay opening provides access to the media bay connector. The media bay connector is configured for removable engagement with the first media connector of the media player. The first and second media connectors are configured to allow data and power transmissions therethrough. The data transmission includes at least two data formats. The docking station also includes one or more outputs that are operatively coupled to the second media bay connector. The outputs are configured to allow at least data transmissions therethrough.

The invention relates, in another embodiment, to a wireless media player system. The wireless media player system includes a hand held media player (e.g., music player) capable of transmitting information over a wireless connection. The wireless media player system also includes one or more media devices (e.g., tuning devices) capable of receiving information over the wireless connection.

The invention relates, in another embodiment, to a method of wirelessly connecting a hand held media player to another device. The method includes selecting a media item on the hand held media player. The method also includes selecting one or more remote recipients on the hand held media player. The method further includes transmitting the media item locally to the hand held media player, and wirelessly to the selected remote recipients.

The invention relates, in another embodiment, to a hand held music player (e.g., MP3 player) that includes a transmitter for transmitting information over a wireless connection. The transmitter is configured to at least transmit a continuous music feed to one or more personal tuning devices that each include a receiver capable of receiving information from the transmitter over the wireless connection.

The invention relates, in yet another embodiment, to a connector for use in a media player system. The connector includes a housing and a plurality of spatially separated contacts mounted within the housing. A first set of contacts are appropriated for Firewire transmissions, a second set of contacts being appropriated for USB transmissions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6C is a pin designation chart, in accordance with one embodiment of the present invention.

FIG. 9A is a diagram of a cable adapter, in accordance with one embodiment of the present invention.

FIG. 9B is a diagram of a cable adapter, in accordance with one embodiment of the present invention.

FIG. 9C is a diagram of a cable adapter, in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
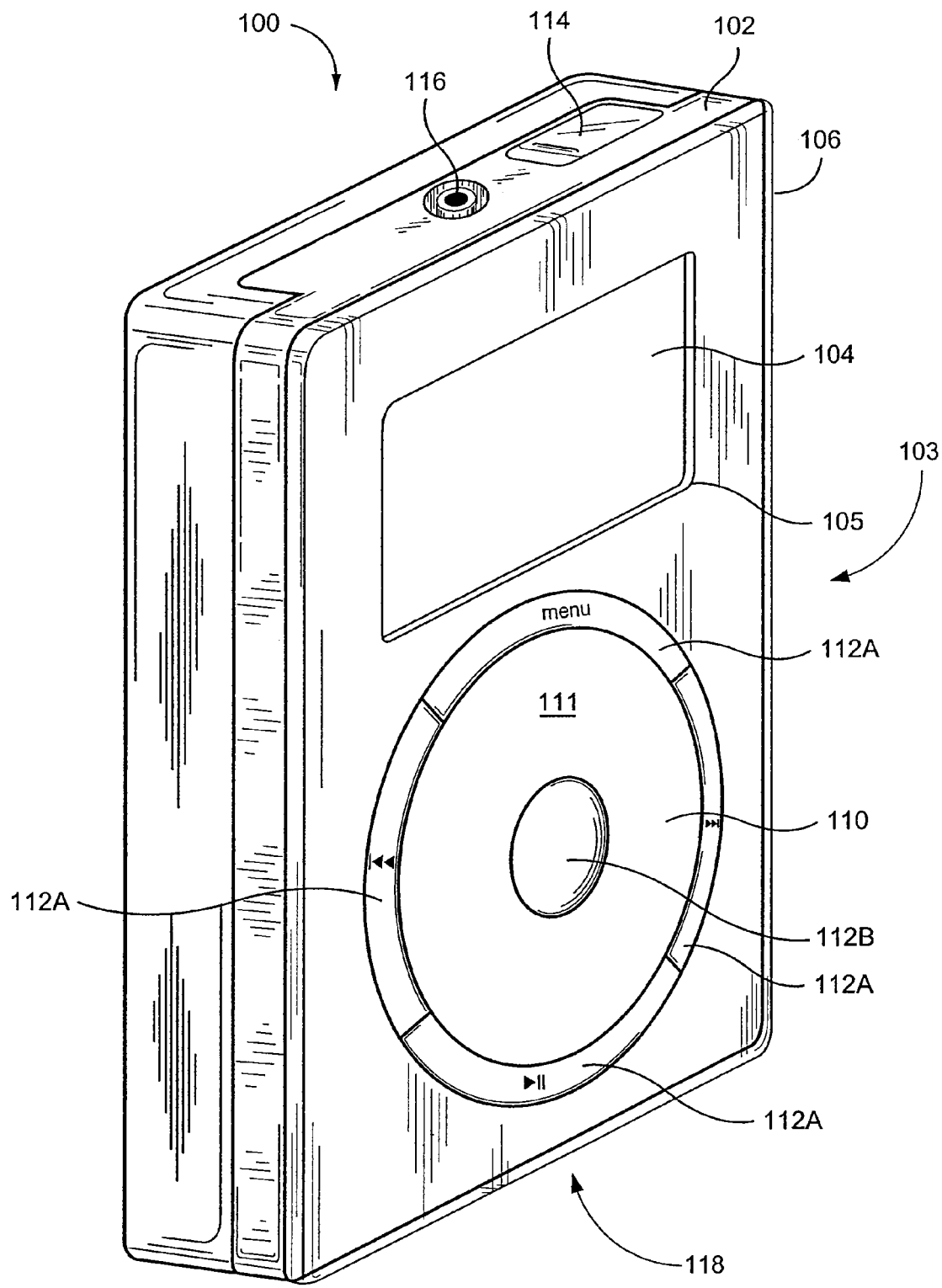
FIG. 1 is a perspective view of a media player, in accordance with one embodiment of the present invention.

FIG. 1 is a perspective diagram of a media player 100, in accordance with one embodiment of the present invention. The term "media player" generally refers to computing devices that are dedicated to processing media such as audio, video or other images, as for example, music players, game players, video players, video recorders, cameras, and the like. In some cases, the media players contain single functionality (e.g., a media player dedicated to playing music) and in other cases the media players contain multiple functionality (e.g., a media player that plays music, displays video, stores pictures and the like). In either case, these devices are generally portable so as to allow a user to listen to music, play games or video, record video or take pictures wherever the user travels.

In one embodiment, the media player is a handheld device that is sized for placement into a pocket of the user. By being pocket sized, the user does not have to directly carry the device and therefore the device can be taken almost anywhere the user travels (e.g., the user is not limited by carrying a large, bulky and often heavy device, as in a laptop or notebook computer). For example, in the case of a music player, a user may use the device while working out at the gym. In case of a camera, a user may use the device while mountain climbing. In the case of a game player, the user can use the device while traveling in a car. Furthermore, the device may be operated by the users hands, no reference surface such as a desktop is needed. In the illustrated embodiment, the media player 100 is a pocket sized hand held MP3 music player that allows a user to store a large collection of music (e.g., in some cases up to 4,000 CD-quality songs). Although used primarily for storing and playing music, the MP3 music player shown herein may also include additional functionality such as storing a calendar and phone lists, storing and playing games, storing photos and the like. In fact, in some cases, it may act as a highly transportable storage device.

By way of example, the MP3 music player may correspond to the Ipod MP3 player manufactured by Apple Computer of Cupertino, Calif. The pocket sized Ipod has a width of about 2.4 inches, a height of about 4 inches and depths ranging from about 0.72 to about 0.84 inches.

As shown in FIG. 1, the media player 100 includes a housing 102 that encloses internally various electrical components (including integrated circuit chips and other circuitry) to provide computing operations for the media player 100. In addition, the housing may also define the shape or form of the media player. That is, the contour of the housing 102 may embody the outward physical appearance of the media player 100. The integrated circuit chips and other circuitry contained within the housing may include a microprocessor (e.g., CPU), memory (e.g., ROM, RAM), a power supply (e.g., battery), a circuit board, a hard drive, other memory (e.g., flash) and/or various input/output (I/O) support circuitry. The electrical components may also include components for inputting or outputting music or sound such as a microphone, amplifier and a digital signal processor (DSP). The electrical components may also include components for capturing images such as image sensors (e.g., charge coupled device (CCD) or complimentary oxide semiconductor (CMOS)) or optics (e.g., lenses, splitters, filters). The electrical components may also include components for sending and receiving media (e.g., antenna, receiver, transmitter, transceiver, etc.).

In the illustrated embodiment, the media player 100 includes a hard drive thereby giving the media player massive storage capacity. For example, a 20 GB hard drive can store up to 4000 songs or about 266 hours of music. In contrast, flash-based media players on average store up to 128 MB, or about two hours, of music. The hard drive capacity may be widely varied (e.g., 5, 10, 20 MB, etc.). In addition to the hard drive, the media player 100 shown herein also includes a battery such as a rechargeable lithium polymer battery. These type of batteries are capable of offering about 10 hours of continuous playtime to the media player.

The media player 100 also includes a user interface 103. The user interface 103 allows the user of the media player 100 to initiate actions on the media player 100 and provides the user with output associated with using the media player (e.g., audio, video, images, etc.). The user interface 103 may be widely varied. By way of example, the user interface 103 may include switches, buttons, keys, dials, trackballs, joysticks, touch pads, touch screens, displays, microphones, speakers, cameras, and the like.

In the illustrated embodiment, the media player 100 includes a display screen 104 and related circuitry. The display screen 104 is used to display a graphical user interface as well as other information to the user (e.g., text, objects, graphics). By way of example, the display screen 104 may be a liquid crystal display (LCD). In one particular embodiment, the display screen corresponds to a 160-by-128-pixel high-resolution display, with a white LED backlight to give clear visibility in daylight as well as low-light conditions. As shown, the display screen 104 is visible to a user of the media player 100 through an opening 105 in the housing 102, and through a transparent wall 106 that is disposed in front of the opening 105. Although transparent, the transparent wall 106 may be considered part of the housing 102 since it helps to define the shape or form of the media player 100.

In addition to the display screen 104, the media player 100 also includes a touch pad 110. The touch pad is an intuitive interface that provides easy one-handed operation, i.e., lets a user interact with the media player with one or more fingers. The touch pad 110 is configured to provide one or more control functions for controlling various applications associated with the media player 100. For example, the touch initiated control function may be used to move an object or perform an action on the display screen 104 or to make selections or issue commands associated with operating the media player 100. In order to implement the touch initiated control function, the touch pad 110 may be arranged to receive input from a finger moving across the surface of the touch pad 110, from a finger holding a particular position on the touch pad and/or by a finger tapping on a particular position of the touch pad. The touch pad may be widely varied. For example, the touch pad may be a conventional touch pad based on a Cartesian coordinate system, or the touch pad may be a touch pad based on a Polar coordinate system. Furthermore, the touch pad 110 may be used in a relative and/or absolute mode. In absolute mode, the touch pad 110 reports the absolute coordinates of where it is being touched. For example x, y in the case of the Cartesian coordinate system or (r, θ) in the case of the Polar coordinate system. In relative mode, the touch pad 110 reports the direction and/or distance of change. For example, left/right, up/down, and the like.

The touch pad 110 generally consists of a touchable outer surface 111 for receiving a finger for manipulation on the touch pad 110. Although not shown in FIG. 1, beneath the touchable outer surface 111 is a sensor arrangement. The sensor arrangement includes a plurality of sensors that are configured to activate as the finger sits on, taps on or passes over them. In the simplest case, an electrical signal is produced each time the finger is positioned over a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the media player 100 to perform the desired control function on the display screen 104.

The position of the display screen 104 and touch pad 110 relative to the housing 102 may be widely varied. For example, they may be placed at any external surface (e.g., top, side, front, or back) of the housing 102 that is accessible to a user during manipulation of the media player 100. In most cases, the touch sensitive surface 111 of the touch pad 110 is completely exposed to the user. In the illustrated embodiment, the touch pad 110 is located in a lower, front area of the housing 102. Furthermore, the touch pad 110 may be recessed below, level with, or extend above the surface of the housing 102. In the illustrated embodiment, the touch sensitive surface 111 of the touch pad 110 is substantially flush with the external surface of the housing 102.

The shape of the display screen 104 and the touch pad 110 may also be widely varied. For example, they may be circular, rectangular, triangular, and the like. In general, the outer perimeter of the shaped touch pad defines the working boundary of the touch pad. In the illustrated embodiment, the display screen is rectangular and the touch pad 110 is circular. More particularly, the touch pad is annular, i.e., shaped like or forming a ring. When annular, the inner and outer perimeter of the shaped touch pad defines the working boundary of the touch pad.

In addition to above, the media player 100 may also include one or more buttons 112. The buttons 112 are configured to provide one or more dedicated control functions for making selections or issuing commands associated with operating the media player 100. By way of example, in the case of an MP3 music player, the button functions may be associated with opening a menu, playing a song, fast forwarding a song, seeking through a menu and the like. In most cases, the button functions are implemented via a mechanical clicking action. The position of the buttons 112 relative to the touch pad 110 may be widely varied. For example, they may be adjacent one another or spaced apart. In the illustrated embodiment, the buttons 112 are configured to surround the inner and outer perimeter of the touch pad 110. In this manner, the buttons 112 may provide tangible surfaces that define the outer boundaries of the touch pad 110. As shown, there are four buttons 112A that surround the outer perimeter and one button 112B disposed in the center or middle of the touch pad 110. By way of example, the plurality of buttons 112 may consist of a menu button, play/stop button, forward seek button and a reverse seek button, and the like.

Moreover, the media player 100 may also include a hold switch 114. The hold switch 114 is configured to activate or deactivate the touch pad and/or buttons. This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player.

The media player 100 may also include one or more connectors for receiving and transmitting data to and from the media player. By way of example, the media player may include one or more audio jacks, video jacks, data ports and the like. The media player 100 may also include one or more connectors for receiving and transmitting power to and from the media player 100.

In the illustrated embodiment, the media player includes a headphone jack 116 and a data port 118. The headphone jack 116 is capable of receiving a headphone or speaker plug associated with headphones/speakers configured for listening to sound being outputted by the media device 100. The data port 118, on the other hand, is capable of receiving a data plug/cable assembly configured for transmitting and receiving data to and from a host device such as a general purpose computer (e.g., desktop computer, portable computer). By way of example, the data port 118 may be used to upload or down load audio, video and other images to and from the media device 100. For example, the data port may be used to download songs and play lists, audio books, ebooks, photos, and the like into the storage mechanism of the media player.

The data port 118 may be widely varied. For example, the data port may be a PS/2 port, a serial port, a parallel port, network interface port, a USB port, a Firewire port and/or the like. In some cases, the data port 118 may be a wireless link such as a radio frequency (RF) link or an optical infrared (IR) link in order to eliminate the need for a cable. Although not shown in FIG. 1, the media player 100 may also include a power port that receives a power plug/cable assembly configured for delivering powering to the media player 100. In some cases, the data port 118 may serve as both a data and power port.

Although only one data port is provided, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown in FIG. 1. They may be positioned almost anywhere on the housing (e.g., front, back, sides, top, bottom). For example, the data port may be positioned on the top, sides, back, front surfaces of the housing rather than the bottom surface as shown. Although it should be noted that having the data port on the bottom surface provides some benefits when connecting to other devices.

Figure 2:
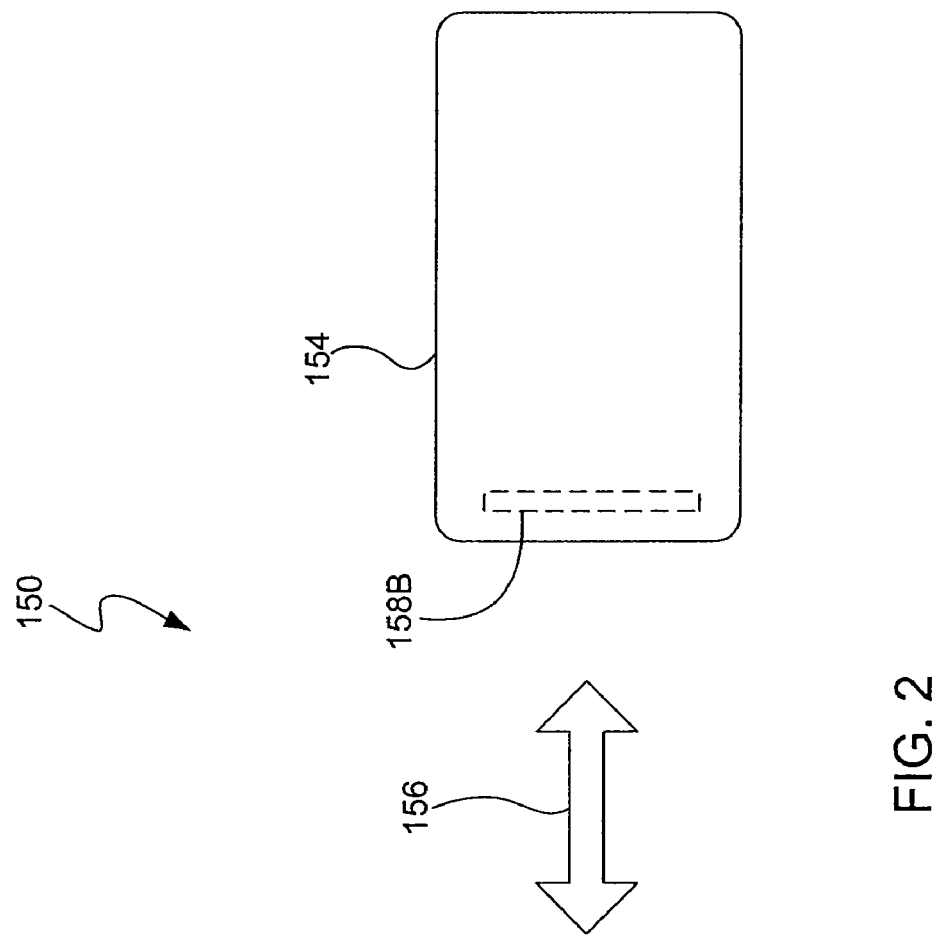
FIG. 2 is a diagram of a media player system, in accordance with one embodiment of the present invention.
Figure 2:
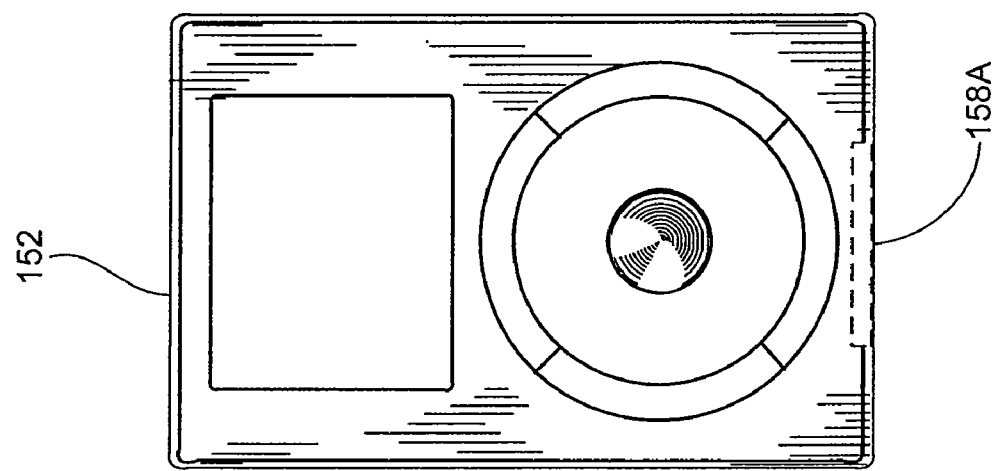

FIG. 2 is a diagram of a media player system 150, in accordance with one embodiment of the present invention. The media player system comprises a media player 152 and one or more media devices 154 that are connected via a media link 156. As mentioned above, the term "media player" generally refers to computing devices that are dedicated to processing media such as audio, video or other images, as for example, music players, game players, video players, video recorders, cameras, and the like. By way of example, the media player 152 may correspond to the media player 100 shown in FIG. 1. Media devices 154 are similar to the media player 152 in that they process media such as audio, video or other images. The media devices may be widely varied. By way of example, the media devices may correspond to other media players, desktop computers, notebook computers, personal digital assistants, video or imaging equipment (e.g., cameras, monitors), audio equipment (home stereos, car stereos, boom boxes), family radios (e.g., walkie talkies), peripheral devices (e.g., keyboards, mice, displays, printers, scanners), personal media devices (discussed in greater detail below) and the like.

The media devices 154 and the media player 152 are configured to communicate with one another through media link 156. The protocol under which they communicate may be widely varied. By way of example, the communication protocol may be a master/slave communication protocol, server/client communication protocol, peer/peer communication protocol, and the like. Using a master/slave communication protocol, one of the devices is a master and the other is a slave. The master controls the slave. Using a client/server communication protocol, a server program responds to requests from a client program. The server program may operate on the media player or the media device. Using a peer to peer communication protocol either of the two devices can initiate a communication session.

The media link 156 may be wired and/or wireless. For example, the media link 156 may be made through connectors and ports or through receivers, transmitters and/or transceivers. The media link may also be one way or two way. For example, in the case of one way, the media player may be configured to transmit signals to the media device but not to receive information from the media device (or vice versa) or in the case of two way, both the media player and media device may be enabled to receive and transmit signals therebetween. The signals may be data (analog, digital), power (AC, DC), and/or the like. In most cases, the data corresponds to data associated with the media player as for example audio, video, images and the like.

Both the media player 152 and the media device 154 include a media terminal 158A and 158B, respectively. The media terminals 158 may provide a direct connection between the media player 152 and the media device 154 (e.g., integrally formed with the media device) or it may provide an indirect connection between the media player 152 and the media device 154 (e.g., a stand alone device). The media terminals 158 provide the media link 156 through one or more connection interfaces. As such, the media player 152 may serve the media devices 154 and/or the media devices 154 may serve the media player 152. The connection interfaces associated with the media terminals 158 may be wired or wireless connection interfaces.

In wired connections, the media terminals 158 are configured to physically connect so as to operatively couple the media player 152 to the media device 154. For example, the media player 152 and the media device 154 may include a mating connection made up of connector and port. By way of example, the connection interface may include one or more of the following interfaces: PS/2, serial, parallel, network (e.g., Ethernet), USB, Firewire and/or the like. The connection interface may also include one or more remote, audio (digital or analog), video (digital or analog), and/or charging interfaces. In one embodiment, the media terminal 158B is a part of docking station that permits the media player 152 to connect with the media device 154. The docking station may be integrally formed with the media device 154 thereby providing a direction connection with the media player 152 or it may be a standalone device that provides an indirect connection between the media player 154 and the media device 152.

In wireless connections, the media terminals 158 do not physically connect. For example, the media player 152 and the media device 154 may include a receiver and transmitter for wireless communications therebetween. By way of example, the connection interface may include one or more of the following interfaces: FM, RF, Bluetooth, 802.11 UWB (ultra wide band), IR, magnetic link (induction) and/or the like.

In brief, FM (frequency modulation) is a method of impressing data onto an alternating-current (AC) wave by varying the instantaneous frequency of the wave. This scheme can be used with analog or digital data. RF generally refers to alternating current AC having characteristics such that, if the current is input to an antenna, an electromagnetic field is generated suitable for wireless broadcasting and/or communications. The frequencies associated with RF cover a wide range of the electromagnetic radiation spectrum as for example from about 9 kHz to thousands of GHz. Bluetooth generally refers to a computing and telecommunications industry specification that describes how mobile phones, computers and personal digital assistants can easily interconnect with each other using short range wireless connection. 802.11 generally refers to a family of specification for wireless local area networks (WLANs) developed by a working group of the Institute of Electrical and Electronics Engineers (IEEE). UWB refers to a wireless technology for transmitting large amounts of digital data over a wide spectrum of frequency bands with very low power for a short distance. IR generally refers wireless technologies that convey data through infrared radiation.

FIGS. 3 and 4 are diagrams of docking stations 170 and 172, respectively, in accordance with several embodiment of the present invention. The docking stations 170 and 172 are hardware components that include a set of connection interfaces that allow a media player 174 to communicate with other media devices (not shown) that are not usually taken along with the media player 174. That is, the docking stations 170 and 172 make available additional functionality that would not otherwise be achieved through the media player 174 and/or the other media devices. The docking stations 170 and 172 may be built into the media device (e.g., hard wired) or they may be stand-alone devices that are connected to the media device through a separate connection (e.g., cord). By way of example, the media player 174 may generally correspond to the media player shown in FIG. 1.

Figures 3A, 3B:
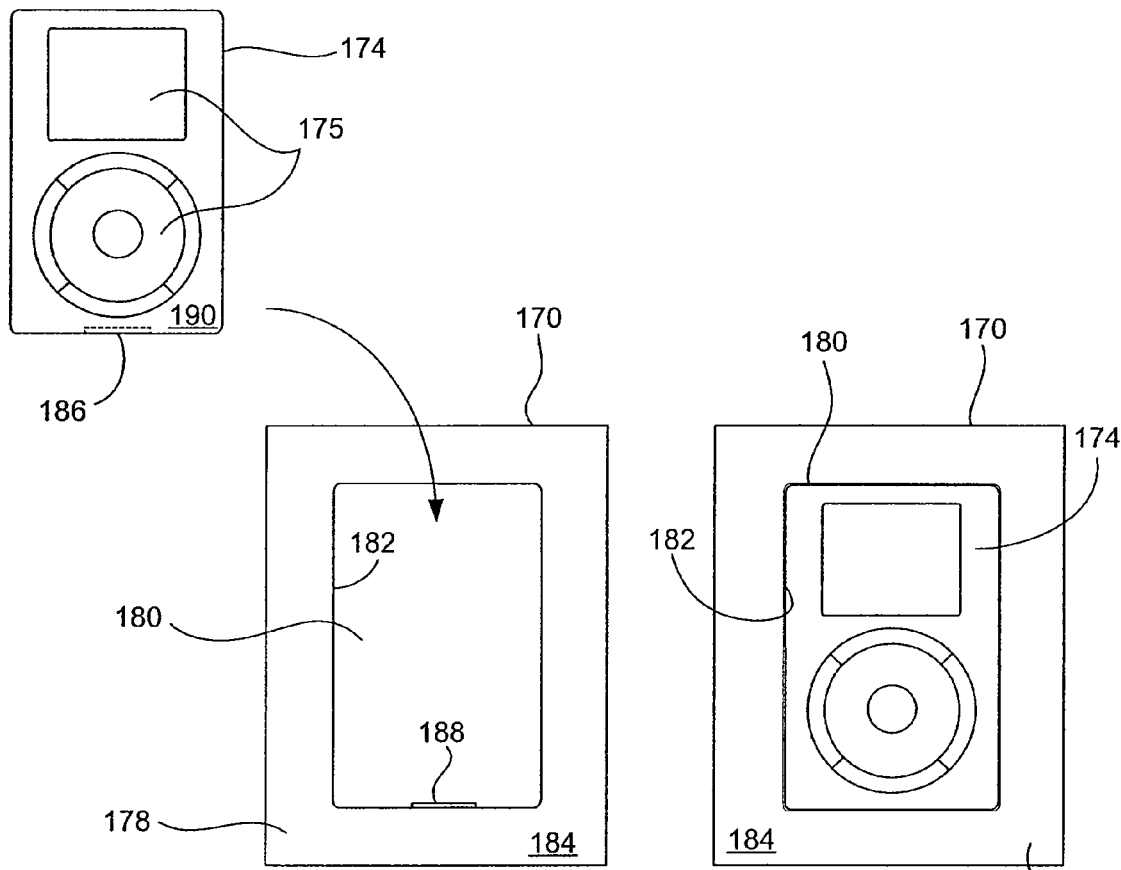
FIGS. 3A and 3B are diagrams of a docking station, in accordance with one embodiment of the present invention.
Figures 4A, 4B:
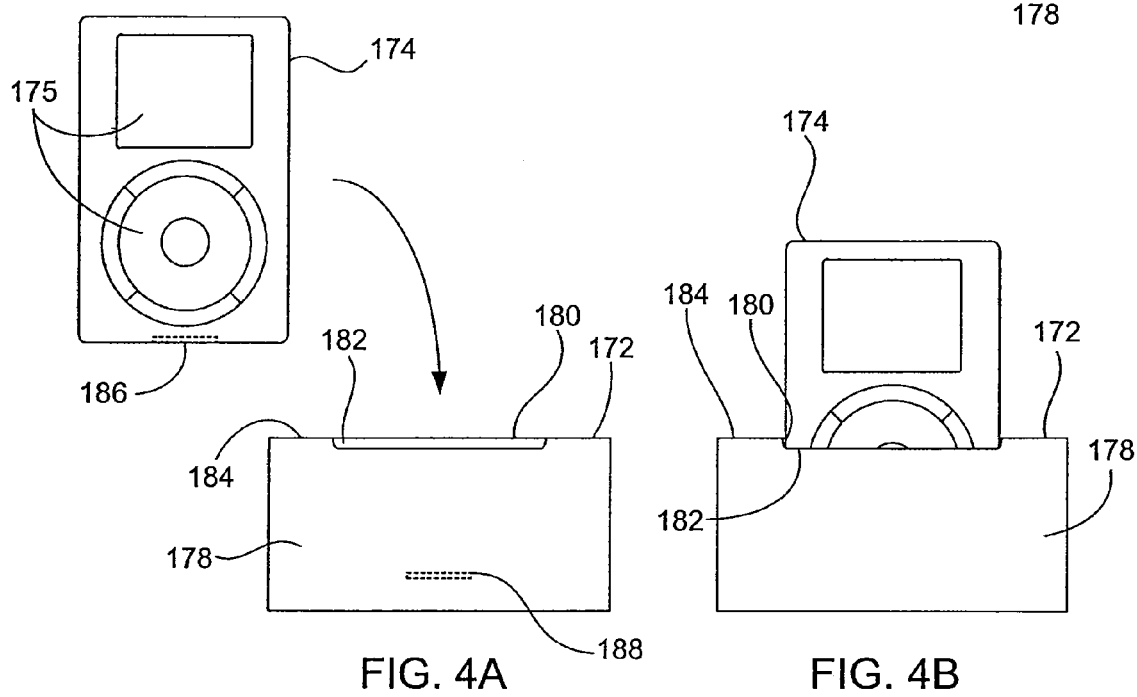
FIGS. 4A and 4B are diagrams of a docking station, in accordance with one embodiment of the present invention.

As shown, each of the docking stations includes a housing 178. The housings 178 are configured with a media bay 180 capable of receiving the media player 174 for direct or indirect connection to a media device. The media bay 180 includes a media bay opening 182 in the surface 184 of the housing 178. The media bay opening 182 is configured to physically receive the media player 174. In other words, the media player 174 can be inserted into the media bay opening 182. Once the media player 174 is inserted into the media bay opening 182 (as shown in FIGS. 3B and 4B), the functionality provided by a media device operatively coupled to the docking stations 170 and 172 becomes available for use by the media player 174. Additionally or alternatively, the functionality provided by the media player 174 may become available for use by the media device operatively coupled to the docking stations 170 and 172. In most cases, a connector 186 of the media player 174 couples to a corresponding connector 188 within the media bay 180 when the media player 174 is placed in the inserted position. The media player 180 essentially becomes a fixed location device when coupled to the docking stations 170 and 172 through the media bay 180 (unless the docking station happens to be in another mobile device). When the media player 174 is taken out, it becomes mobile again. As should be appreciated, the docking stations 172 and 174 let a user simultaneously enjoy expansion possibilities with the portability of a smaller device.

The media bays 180 of the docking stations 170 and 172 may be widely varied. In most cases, the media bay openings 182 are dimensioned to receive the media players 174. That is, the inner peripheral surfaces of the media bay openings 182 are sized to receive the outer peripheral surfaces of the media player 174 (allowing for some tolerances). In FIG. 3, the media bay 180 is configured to receive the back end of the media player 174 while in FIG. 4 the media bay 180 is configured to receive a bottom end of the media player 174. In either case, the connector 186 on the media player 174 is configured to connect with the connector 188 on the docking station 170 and 172 when the media player 174 is inserted in the media bay 180. The position of the inserted media player 174 relative to the housing 178 may be widely varied. For example, the media bay 180 may be configured to receive the entire media player 174 as shown in FIG. 3 or it may only be configured to receive a portion of the media player 174 as shown in FIG. 4.

The inserted media player 174 is typically retained within the media bay 180 until it is removed from the media bay 180 (e.g., doesn't slide out). For example, a retention mechanism such as a snap, a spring loaded latch or a magnet may be used to hold the media player 174 within the media bay opening 182. The media player 174 may also be held within the opening 182 by the force of the engaged connectors 186/188 or under its own weight (e.g., gravity). An ejection mechanism may additionally be used to release the media player 174 from the media bay 180 (e.g., to overcome any holding forces). In some cases (as shown in FIG. 3), the user interface 175 of the media player 174 is completely exposed to the user so that it is accessible to a user while inserted in the media bay 180. In cases such as these, the user interface 175 (e.g., front surface of the media player) may be recessed below, level with, or extend above the external surface of the housing 178. In the illustrated embodiment of FIG. 3, the front surface 190 of the media player 174 is substantially flush with the external surface 184 of the housing 178.

Figure 5:
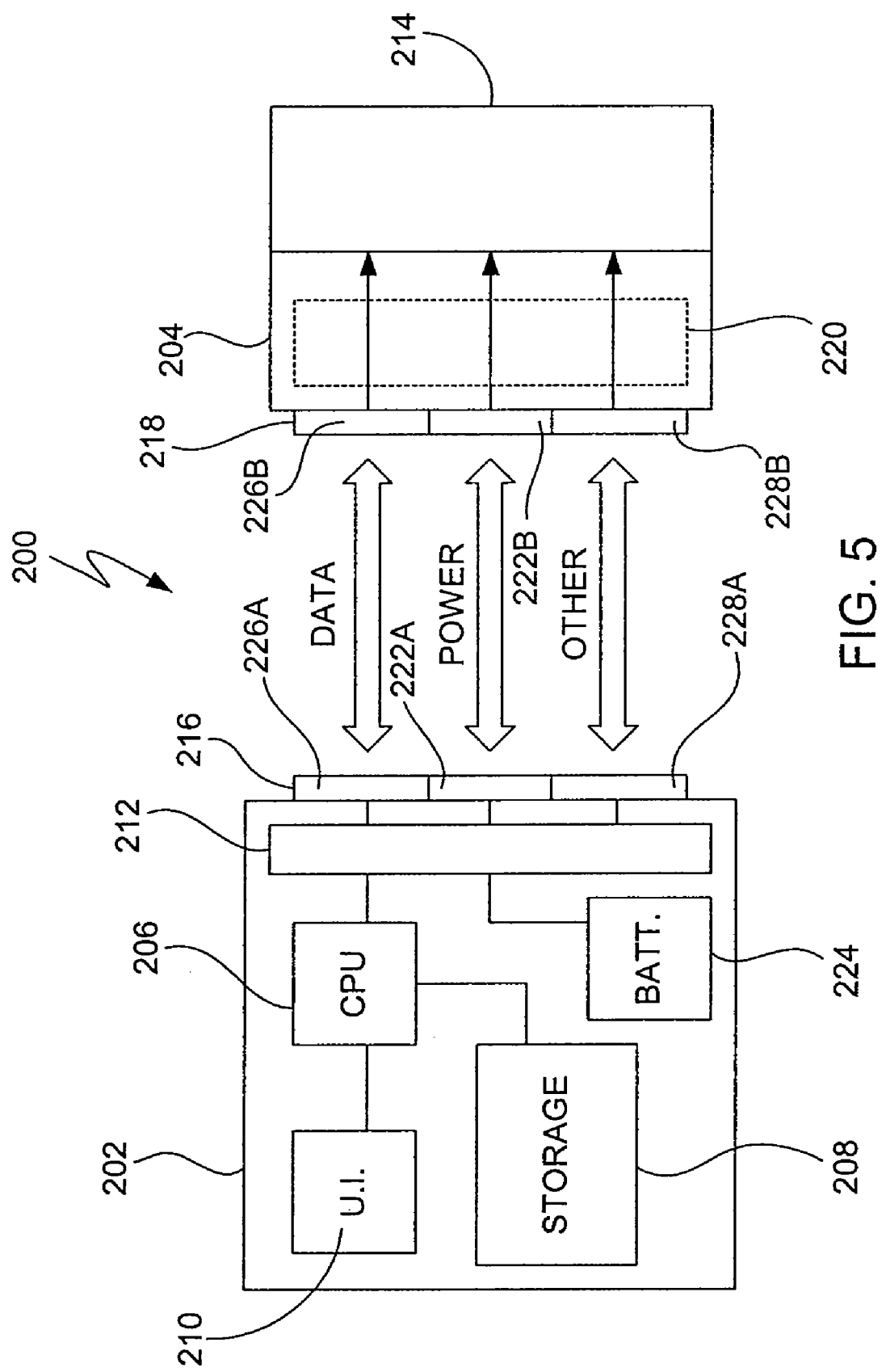
FIG. 5 is a block diagram of a media player system, in accordance with one embodiment of the present invention.

FIG. 5 is a block diagram of a media player/docking station system 200, in accordance with one embodiment of the present invention. The system 200 generally includes a media player 202 and a docking station 204. By way of example, the media player and docking station may correspond to the media player and docking station shown in FIGS. 3 and 4. As shown, the media player 202 includes a processor 206 (e.g., CPU or microprocessor) configured to execute instructions and to carry out operations associated with the media player 202. For example, using instructions retrieved for example from memory, the processor 206 may control the reception and manipulation of input and output data between components of the media player 202. In most cases, the processor 206 executes instruction under the control of an operating system or other software. The processor 206 can be a single-chip processor or can be implemented with multiple components.

In most cases, the processor 206 together with an operating system operates to execute computer code and produce and use data. The computer code and data may reside within a program storage block 208 that is operatively coupled to the processor 206. Program storage block 208 generally provides a place to hold data that is being used by the system 200. By way of example, the program storage block 208 may include Read-Only Memory (ROM), Random-Access Memory (RAM), hard disk drive, flash memory and/or the like. As is generally well known, RAM is used by the processor as a general storage area and as scratch-pad memory, and can also be used to store input data and processed data. ROM can be used to store instructions or program code followed by the processor as well as other data. Hard disk drives can be used to store various types of data and can permit fast access to large amounts of stored data. The computer code and data could also reside on a removable program medium and loaded or installed onto the computer system when needed.

In one embodiment, program storage block 208 is configured to store an audio program for controlling the distribution of audio in the media player 202. The audio program may contain song lists associated with songs also stored in the storage block 208. The songs may be accessed through a user interface 210 operatively coupled to the processor 206. The user interface 210 may include a display for visually displaying the song lists (as part of a GUI interface) and a touch pad or buttons for selecting a song to be played or reviewing and/or customizing the song lists, i.e., the user may quickly and conveniently review the lists and make changes or selections thereto.

The media player also includes an input/output (I/O) controller 212 that is operatively coupled to the processor 206. The (I/O) controller 212 may be integrated with the processor 206 or it may be a separate component as shown. The I/O controller 212 is generally configured to control interactions with one or more media devices 214 that can be coupled to the media player 202. The I/O controller 212 generally operates by exchanging data (and/or power) between the media player 202 and the media devices 214 that desire to communicate with the media player 202. In some cases, the media devices 214 may be connected to the I/O controller 212 through wired connections and in other cases the media devices 214 may be connected to the I/O controller 212 through wireless connections. In the illustrated embodiment, the media device 214 is capable of being connected to the I/O controller 212 through a wired connection.

The media player 202 also includes a connector 216 capable of connecting to a corresponding connector 218 located within the docking station 204. The docking station 204 is operatively coupled to the media device 214 through transfer circuitry 220. The transfer circuitry 220 may provide a direct or indirect link to the media device 214. For example, the transfer circuitry 220 may be hard wired to the media device 214 as for example when the docking station 204 is integrated with the media device 214 or it may be passively wired as through a cord that temporarily plugs into the media device 214.

The connector arrangement 216/218 used to connect the media player 202 and the docking station 204 may be widely varied. However, in the illustrated embodiment, the connector arrangement 216/218 includes both power and data contacts. The power contacts 222 of the media player 202 are operatively coupled to a battery 224 of the media player 202 and the data contacts 226 of the media player 202 are operatively coupled to the I/O controller 212. As should be appreciated, the power contacts 222A of the connector 216 are configured to engage the power contacts 222B of the connector 218 so as to provide operational or charging power to the media player 202, and the data contacts 226A of the connector 216 are configured to engage the data contacts 226B of the connector 218 so as to provide data transmissions to and from the media player 202. The data contacts may be widely varied. For example, they may be configured to provide one or more data transmitting functionalities including Firewire, USB, USB 2.0, Ethernet, and the like. The connectors may also include a variety of other contacts 230 for transmitting other types of data as for example remote control, video (in/out), audio (in/out), analog TV, and the like.

Figure 6A:
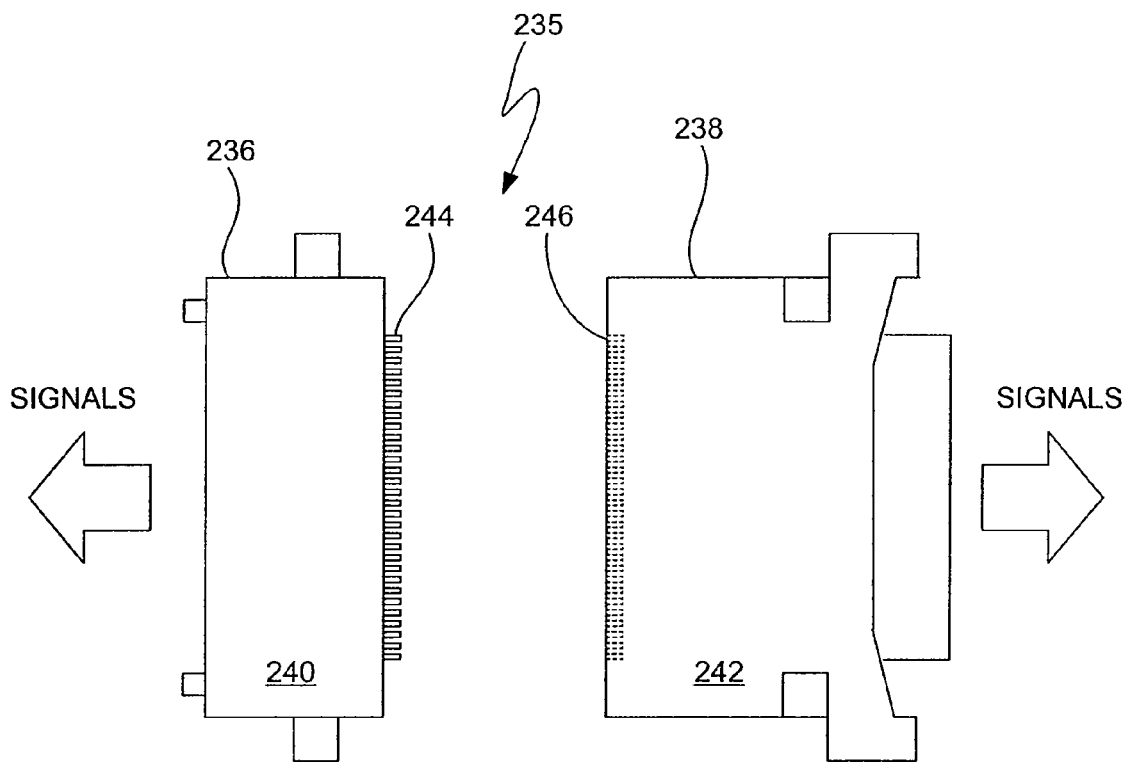
FIG. 6A is a top view of a connector assembly, in accordance with one embodiment of the present invention.
Figure 6B:
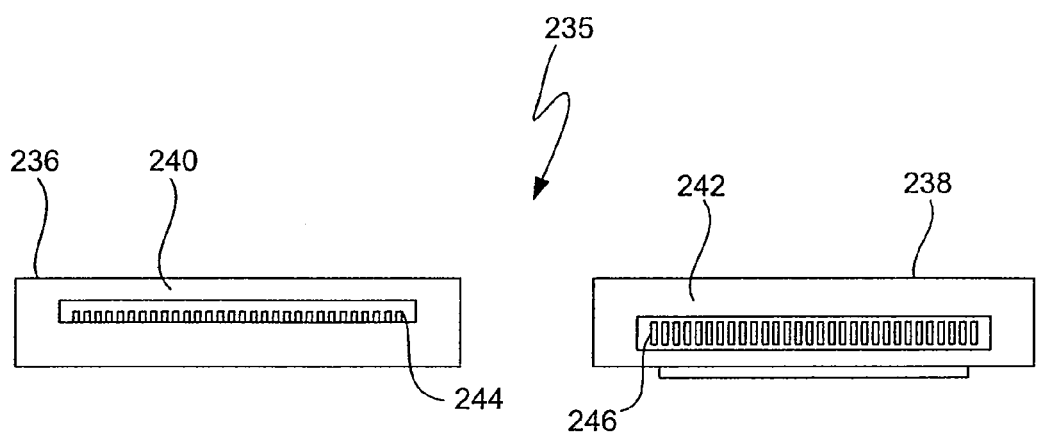
FIG. 6B is a front view of a connector assembly, in accordance with one embodiment of the present invention.

FIGS. 6A and 6B are diagrams of a connector assembly pin arrangement 235, in accordance with one embodiment of the present invention. As shown, the arrangement 235 includes a first connector 236 and a second connector 238. The connectors 236 and 238 may be placed in a media player, docking station, at the end of a cord or cable and/or the like. By way of example, the connectors 236 and 238 may generally correspond to the connectors 216/218 of FIG. 5. The first and second connectors 236 and 238 each include a housing 240 and 242 and a plurality of corresponding contacts 244 and 246 that when engaged operatively couple the connectors 236 and 238 together. The housing is generally formed from an insulating material such as plastic and the contacts are generally formed from an electrically conductive material such as a copper alloy. In the illustrated embodiment, the contacts 244 protrude from the housing 240 for insertion into corresponding contacts 246 that are recessed within the housing 242 (e.g., male-female connection). In some cases, the contacts 244 are configured to snugly fit into the contacts 246 so that the connectors are held together. Additionally or alternatively, the connectors 236 and 238 may include a locking means for locking the connectors together. For example, one of the connectors may include a latch that engages and disengages to and from a portion of the other connector. The configuration of the contacts may be widely varied (e.g., spacing, # of rows or columns, etc.). In the illustrated embodiment, the contacts are spaced apart in a single row. The connectors may be manufactured using a variety of techniques. By way of example, the connectors may be manufactured using techniques similar to those used by JAE of Japan.

The signals carried by the contacts may be widely varied. For example, a portion of the contacts may be dedicated to Firewire signals while another portion may be dedicated to USB signals. The contacts may also be used for grounds, charging, powering, protocols, accessory identification, audio, line-in, line-out, and the like. Additional contacts may be used for grounding the housing of the connector. The number of contacts may also be widely varied. The number generally depends on the signals needed to support the devices using the connectors. In one embodiment, some of the contacts are used to support Firewire while other contacts are used to support USB. In this embodiment, the minimum number of contacts corresponds to the number required to support these devices. In most cases, however, the number of contacts tends to be greater than this number (other signals are needed). In the illustrated embodiment, each of the connectors includes at least 30 contacts, including Firewire contacts, USB contacts, grounding contacts, powering contacts, reserved contacts and the like. An example of a pin count which may used can be seen in FIG. 6C. Although this pin count is shown, it should be noted that it is not a limitation and that any configuration of the functions described therein may be used.

FIGS. 7A-E are diagrams of a stand alone docking station 250, in accordance with one embodiment of the present invention. The stand alone docking station 250 allows a media player 252 to communicate with other media devices (not shown). By stand alone, it is meant that it is physically separated from but operatively connectable to the media device (rather than being integrated therewith). As shown, the docking station 250 includes a housing 254 that encloses internally various electrical and structural components and that defines the shape or form of the docking station 250. The shape of the housing may be widely varied. For example, it may be rectangular, circular, triangular, cubical, and the like. In the illustrated embodiment, the housing 254 has a rectangular shape. The housing 254 may be formed by one or more housing components. For example, as shown, the housing 254 may be made up of a top member 256 and a base member 258. The manner in which the members 256 and 258 are connected may be widely varied (e.g., screws, bolts, snaps, latch, etc.).

Figure 7A:
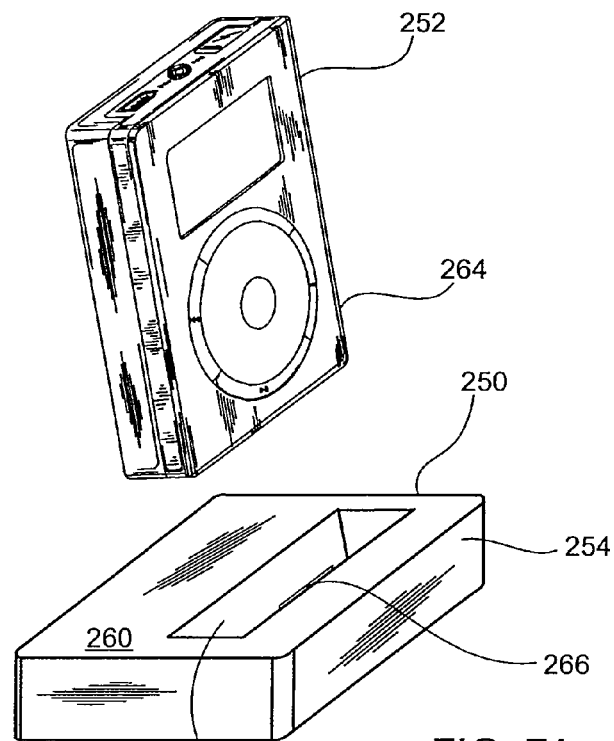
FIG. 7A is a perspective diagram of a stand alone docking station, in accordance with one embodiment of the present invention.
Figure 7B:
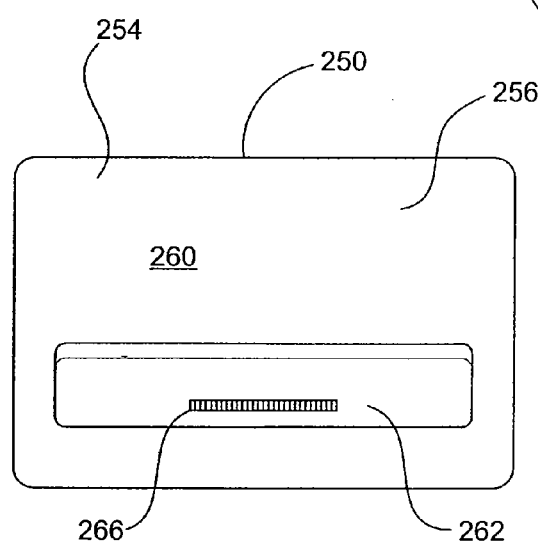
FIG. 7B is a top view of a stand alone docking station, in accordance with one embodiment of the present invention.
Figure 7C:
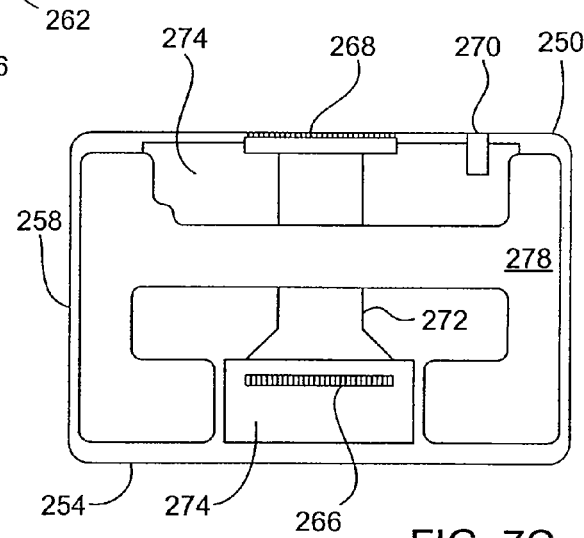
FIG. 7C is a top view of a stand alone docking station with its cover removed, in accordance with one embodiment of the present invention.
Figure 7D:
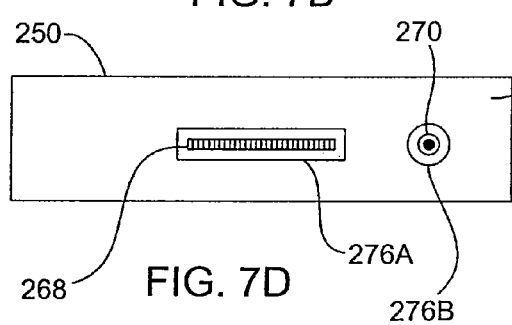
FIG. 7D is a back view of a stand alone docking station, in accordance with one embodiment of the present invention.
Figure 7E:
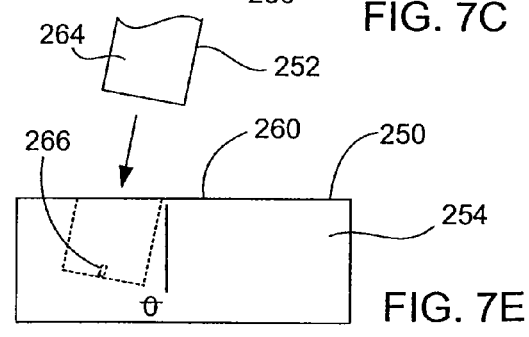
FIG. 7E is a side view of a stand alone docking station, in accordance with one embodiment of the present invention.

Within a top surface 260 of the housing as shown in FIGS. 7A, 7B and 7E there is provided a media bay opening 262 for physically receiving a bottom portion 264 of the media player 252. As shown, the media bay opening 262 has shape that coincides with the shape of the media player 252, i.e., the bottom portion 264 of the media player 252 may be inserted within the media bay opening 262. The depth of the opening 262 is generally configured to keep the user interface of the media player 252 exposed to the user. The opening 262 may be vertical or sloped. As shown in FIG. 7E, the opening 262 is sloped so that the media player 252 rests in a tilted position within the docking station 250. As should be appreciated, a tilted media player 252 is easier to use (e.g., more ergonomic). The slope may be widely varied. For example, it may tilt the media player 252 about 5 to about 25 degrees and more particularly about 15 degrees.

Inside the opening 262 there is provided a first connector 266 for engaging a corresponding connector disposed on the bottom surface of the media player 252. The first connector 266 is typically exposed through the housing 254 so that the media player connector can engage it. By way of example, the connector arrangement may correspond to the connector arrangement shown in FIG. 6. In the illustrated embodiment, the media player connector is a female port and the docking station connector 266 is a male plug. The plug is generally dimension for a tight fit within the port so as to secure the connection between the media player 252 and the docking station 250 (e.g., no interlock except for connector). The first connector 266 is generally sloped to a similar angle as the opening 262 so that engagement occurs between the first connector and the media player connector when the media player 252 is slid into the opening 262. As should be appreciated, the sides of the opening 262 serve as guides for placing the connectors in the correct engagement position.

The first connector 266 may be operatively coupled to one or more second connectors, each of which may be used to connect to some external device such as a media device, power plug and the like. In some cases, the information passing through the first connector 266 is directed to a single second connector while in other cases the information is split into multiple second connectors. For example, the contacts of a single connector 266 may be split into different connectors such as one or more data lines, power lines, audio lines and the like. The second connectors may be similar to the first connector or they may be different. Furthermore, multiple second connectors may be similar or they may be different from one another. The second connectors are also exposed through the housing. In some cases, the second connectors are indirectly coupled to the docking station 250. For example, they may be coupled to the docking station 250 through a cord or cable that is attached to the docking station 250. One end of the cord is coupled to the docking station 250 while the other end, which includes the second connector is free to be engaged with an external device. In other cases, the second connectors are directly coupled to the docking station 250. For example, they may be attached to a portion of the docking station 250 without using a cord or cable. In cases such as these, the second connectors are free to be engaged directly to an external device or they may be coupled through a removable cord or cable. Alternatively or additionally, the cord it self may be used to split information, i.e., a Y cord or cable.

The internal components of the docking station 250 can best seen in FIG. 7C. FIG. 7C shows the docking station 250 with the top member 256 of the housing 254 removed. As shown, the internal components include at least a first connector 266 and a second connector 268 (both of which may correspond to a connector arrangement shown in FIG. 6). The internal components may also include an audio out connector 270. The connectors 266-270 are connected via a flex cable 272. The connectors 266-270 are positioned on one or more printed circuit boards 274 that are attached to the base member 258 of the housing 254. The first connector 266 is located at a position that places it within the opening 262 of the housing 254 (as shown in FIG. 7B). The second connector 268 and the audio out connector 270 are located at positions that place them within openings 276 at the backside of the housing 254 for external connection therefrom (as shown in FIG. 7D). Also contained within the housing 254 is a ballast 278 enabling the docking station 250 to support the media player 252 when inserted therein. An EMI shield may also be placed over the flex cable 272 to provide shielding.

Figure 8:
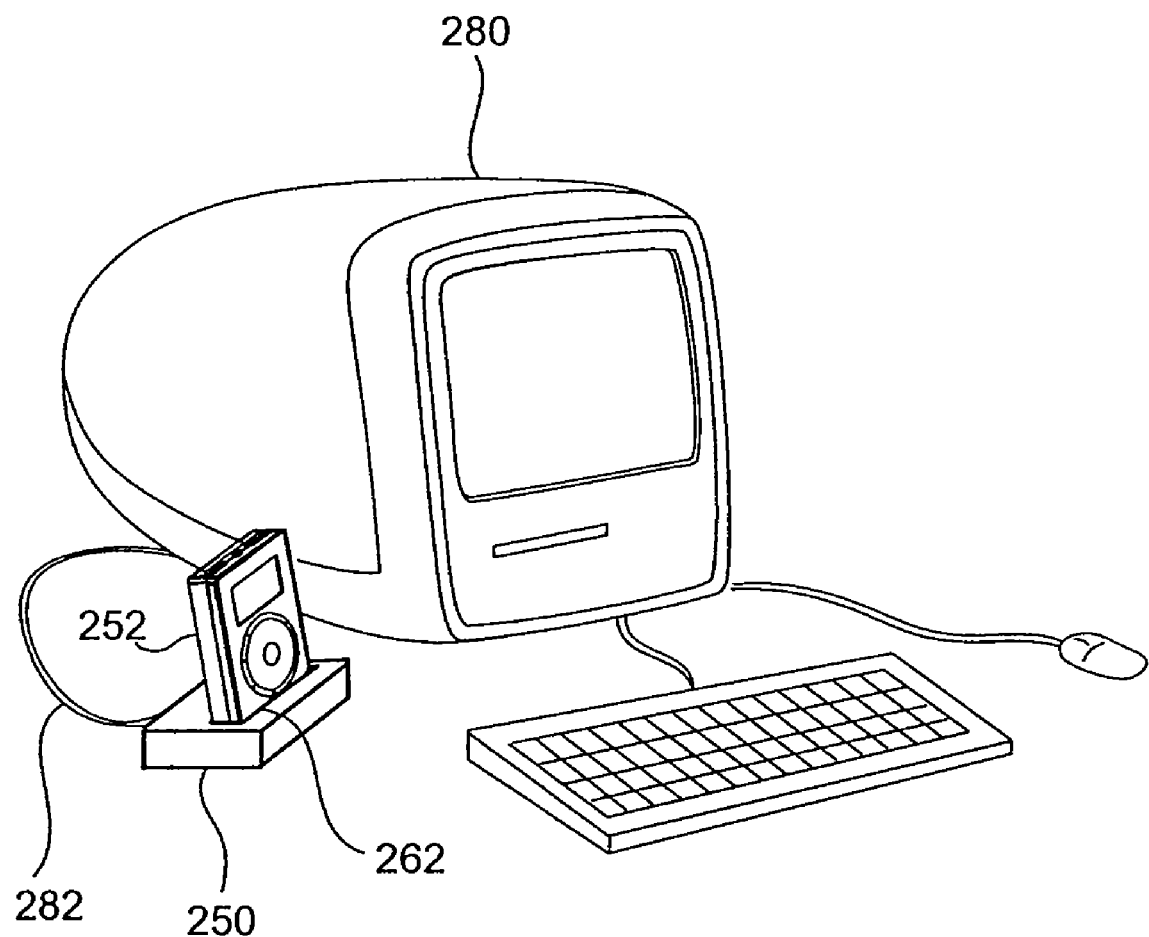
FIG. 8 is a diagram of a media player docking station in use, in accordance with one embodiment of the invention.

FIG. 8 is an illustration showing the docking station 250 of FIG. 7 in use, in accordance with one embodiment of the present invention. As shown, the docking station 250 is operatively coupled to a media device 280 through a cable 282, i.e., the first end of the cable 282 is engaged with the second connector 268 of the docking station 250 and the second end of the cable 282 is engaged with a connector positioned on the media device 280. Furthermore, the media player 252 is operatively coupled to the docking station 250 via the above mentioned connector arrangement, i.e., the media player 252 is positioned in the media bay opening 262 of the docking station 250 such that the connectors are engaged. Through these connections, the media player 252 may communicate with the media device 280, i.e., data and/or power may be passed therebetween. In the illustrated embodiment, the media player 252 is a music player and the media device 280 is a desktop computer. As such, the user, for example using the user interface on the media player 252, may upload or down load songs between the media player 252 and the desktop computer 280 via the docking station 250. When uploading and downloading are completed, the user may simply remove the media player 252 from the docking station 250 and walk away.

FIGS. 9A-9C are diagrams of cable adapters 300, 302 and 304, respectively, that may be used with the docking station 250 of FIG. 7, in accordance with several embodiments of the present invention. In all three figures, the cable adapters 300, 302 and 304 include a docking station connector 306. The docking station connector 306 is configured to be received by the second connector 268 of the docking station 250. Although this connector arrangement may be widely varied, in the illustrated embodiment, the connector arrangement corresponds to the connector arrangement shown in FIG. 6.

Figure 9D:
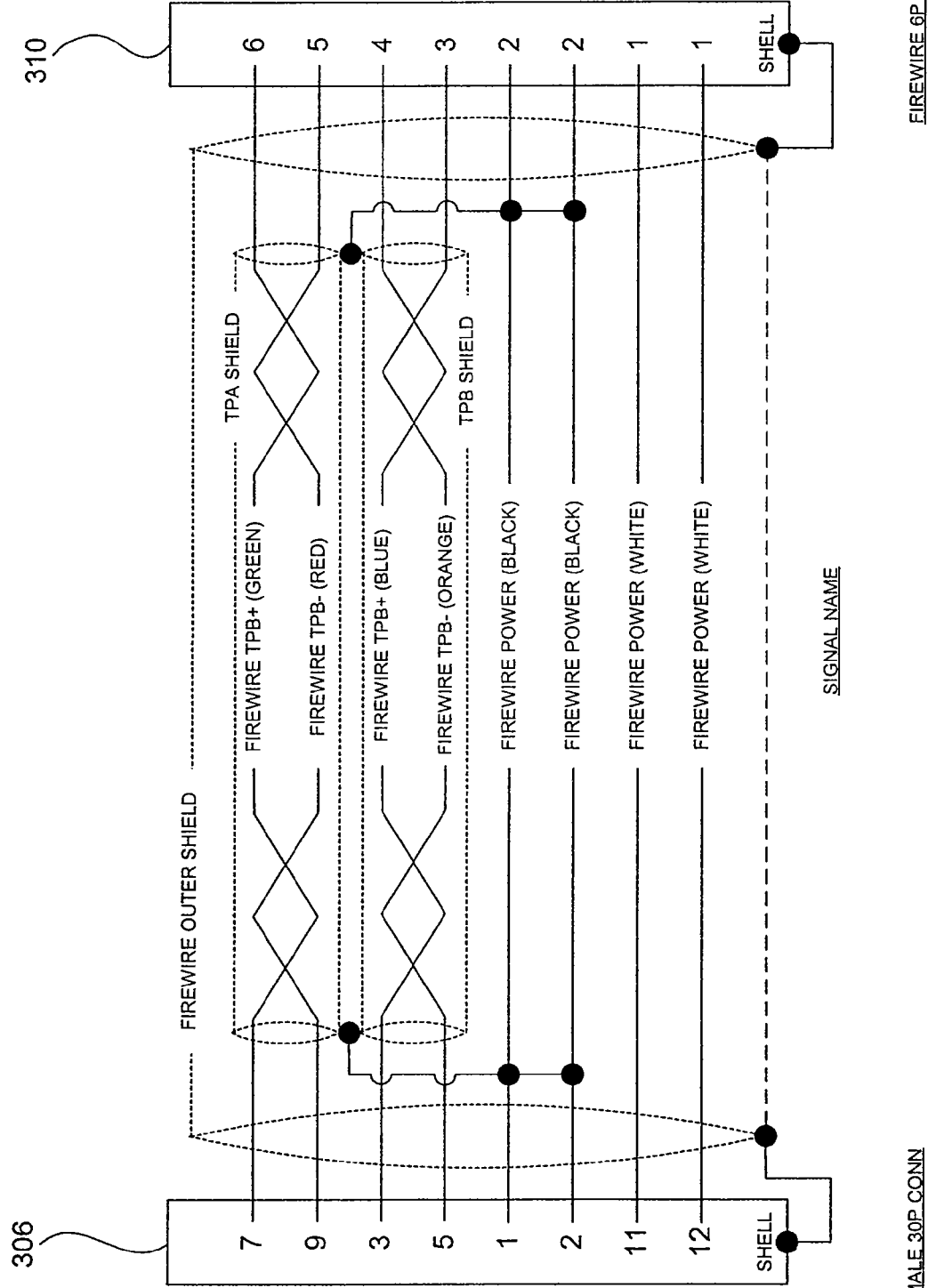
FIG. 9D is a functional diagram of a cable adapter, in accordance with one embodiment of the present invention.

As shown in FIG. 9A, the cable adapter 300 includes a cable 308. The docking station connector 306 is disposed at one end of the cable 308 and a media device connector 310 is disposed at the other end of the cable 308. The media device connector 310 may be widely varied. For example, it may correspond to a power connector, a Firewire connector, a USB connector and the like. It may also correspond to a connector similar to the docking station connector. In the illustrated embodiment, the media device connector 310 is a Firewire connector. An example of a cable adapter 300 including a docking station connector 306 using the pin count of FIG. 6C and a media device connector 310 using a 6 pin Firewire is shown in FIG. 9D.

Referring to FIG. 9B, the cable adapter 302 includes a pair of cables 312 and 314. The docking station connector 306 is disposed at one end of the cables 312 and 314 and a plurality of media device connectors 316 are disposed at the other ends of the cables 312 and 314. Each of the media device connectors 312 and 314 may be widely varied. For example, they may correspond to a power connector, a Firewire connector, a USB connector and the like. In the illustrated embodiment, the first media device connector 316A is a power connector and the second media device connector 316B is a USB connector.

As shown in FIG. 9C, the cable adapter 304 is configured to be used with a car stereo. The cable adapter includes a cable 318. The docking station connector 306 is disposed at one end of the cable 318 and a media device connector 320 is disposed at the other end of the cable 318. In this particular embodiment, the media device connector 320 is in the form of a cassette for insertion into a cassette deck of the car stereo. The cable adapter 304 also includes a power adapter plug 322 configured for insertion into a car power jack (e.g., cigarette lighter). The power adapter plug 322 extends from the docking station connector 306. In order to use the cable adapter 304, the user simply places the power adapter plug 322 in the power jack (this supports the docking station as well as provides power therethrough for powering or charging the media player) and the media device connector 320 in the cassette deck of the car stereo. The user may then select a song to be played through the car stereo using the user interface of the media player.

Although the cable adapters are shown as separate components of the docking station, it should be noted that in some embodiments they may be integrated therewith. That is, instead of having a docking station connector, the ends of the cables may be attached to the docking station.

Referring to FIGS. 10-14, integrated docking stations will be described in greater detail. Like stand alone docking stations, the integrated docking stations allow a media player to communicate with other media devices. However, unlike the stand alone docking station, the integrated docking station is integrated with or built into the media device. As should be appreciated, the electrical and structural components of the integrated docking station are typically enclosed via the housing of the media device, i.e., the docking stations do not have their own housing. The housing of the media devices also typically defines the media bay in which the media player is placed for connectivity to the media device. That is, the media devices themselves include one or more media bays for receiving the media players. The media bays are typically externally accessible to the media players so that media players can be easily be inserted into or removed from the media bays. The media bays may be any of those previously described. The removability of the media players allows the media player to support a variety of different types of media devices in a flexible manner. By way of example, the media devices may correspond to desktop computers, notebook computers, home sound systems, car sound systems, portable sound systems, home theater systems, video projectors, displays, audio or video recording equipment, cameras (e.g., photos, video), telephones, and the like. They may also include peripheral computing devices such as scanners, printers, keyboards, and the like.

Figure 10:
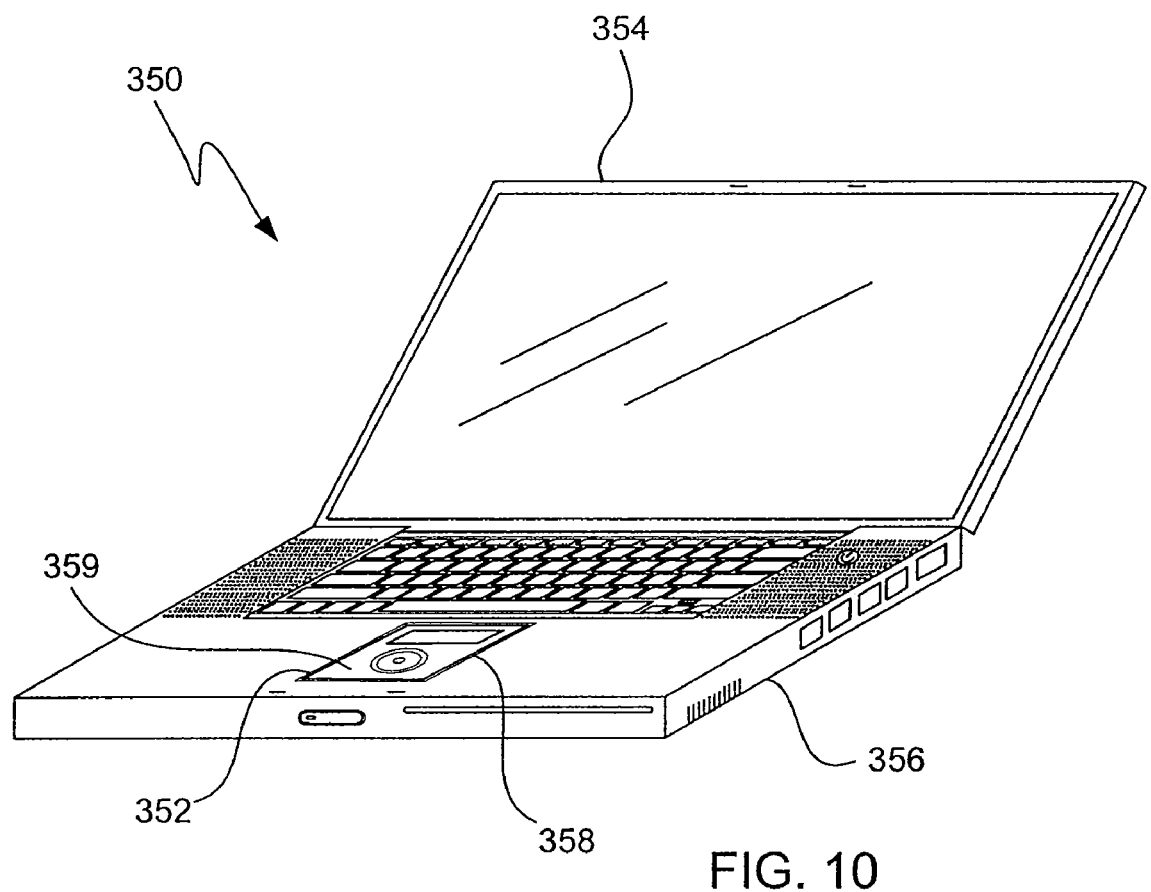
FIG. 10 is a diagram of a notebook computer with a built-in docking station, in accordance with another embodiment of the present invention.

FIG. 10 is a notebook computer 350 with an integrated docking station 352, in accordance with one embodiment of the present invention. The notebook computer 350 includes a lid 354 and a base 356. The docking station 352 is integrated within the base 356. The docking station 352 includes a media bay 358 that may be placed anywhere on the base 356, as for example, the sides, top, front, back or bottom surfaces. The media bay 358 may be configured to receive any surface of a media player 359 so long as a connection is made between the media player 359 and the docking station 352. For example, it may be configured to receive the back of the media player as shown in FIG. 3 or it may be configured to receive the bottom of the media player as shown in FIG. 4. In the illustrated embodiment, the media bay 358 is configured to receive the back side of the media player 359 thus exposing the user interface of the media player 359 to the user. In some cases, the user interface may be the primary user interface of the notebook computer 350. For example, the touch pad of the media player shown in FIG. 1 may be used to perform actions on the notebook computer 350. By way of example, the notebook computer may correspond to any of those manufactured by Apple Computer of Cupertino, Calif.

Figure 11:
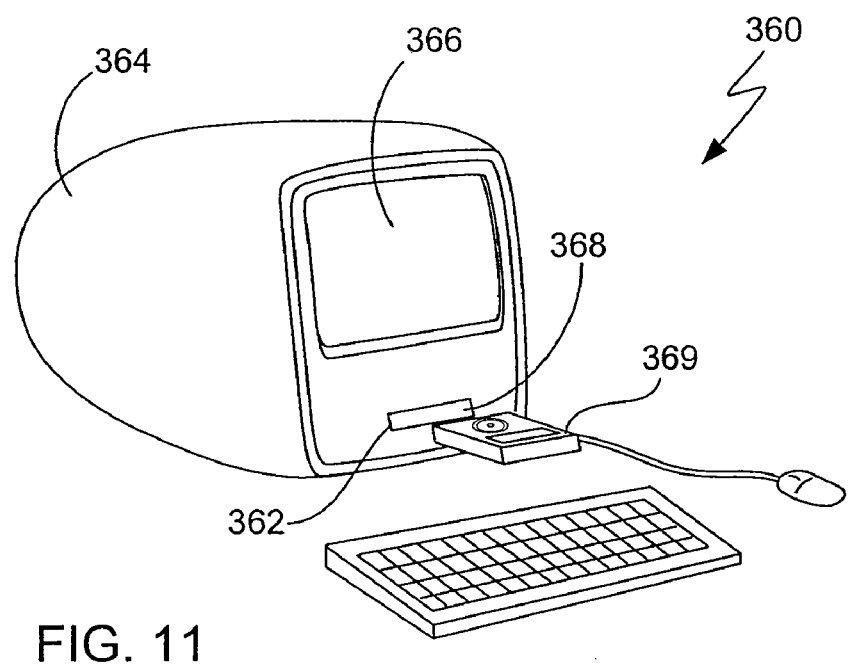
FIG. 11 is a diagram of a desktop computer with a built-in docking station, in accordance with another embodiment of the present invention.

FIG. 11 is a perspective diagram of a general purpose computer 360 with an integrated docking station 362, in accordance with one embodiment of the present invention. The computer 360 generally includes a base 364 and a display 366 operatively coupled to the base 364. The base 364 and the display 366 may be separate components, i.e., they each have their own housing, as in traditional computers or they may be integrated into a single housing so as form an all in one machine (as shown). The docking station 362 is integrated within the base 364. The docking station 362 includes a media bay 368 that may be placed anywhere on the base, as for example, the sides, top, front, back or bottom surfaces. The media bay 368 may be configured to receive any surface of a media player 369 so long as a connection is made between the media player 369 and the docking station 362. For example, it may be configured to receive the back of the media player as shown in FIG. 3 or it may be configured to receive the bottom of the media player as shown in FIG. 4. In the illustrated embodiment, the media bay 368 is configured to receive the bottom side of the media player 369. In some cases, the user interface of the media player 369 may be exposed and in other cases, the user interface may be completely covered within the media bay 358. By way of example, the general purpose computer may correspond to any of those manufactured by Apple Computer of Cupertino, Calif.

Figure 12:
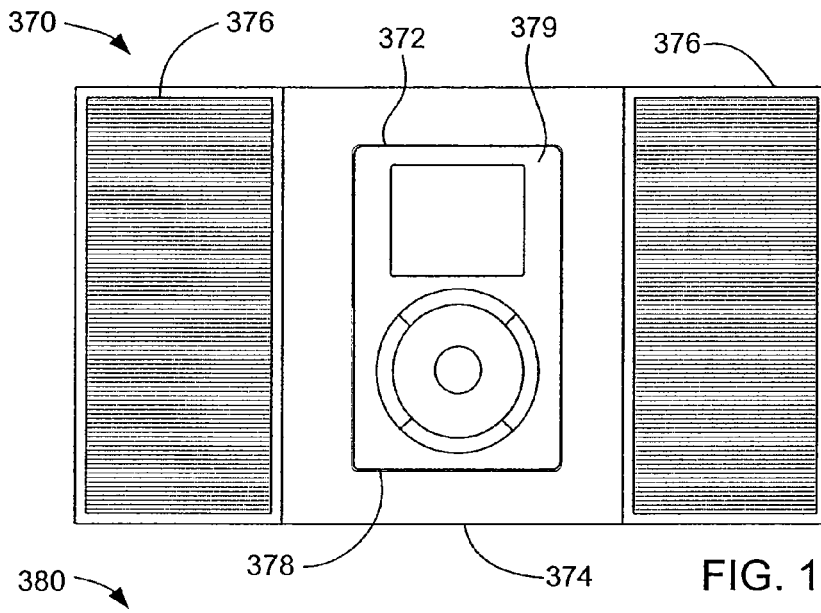
FIG. 12 is a diagram of a boom box with a built-in docking station, in accordance with another embodiment of the present invention.

FIG. 12 is front view of a sound system 370 with an integrated docking station 372, in accordance with one embodiment of the present invention. The sound system may be widely varied. For example, it may be a substantially fixed or portable unit. In the illustrated embodiment, the sound system 370 is a flat panel unit that includes a base 374 and a pair of speakers 376. The docking station 372 is integrated within the base 374. The docking station 372 includes a media bay 378 that may be placed anywhere on the base 374, as for example, the sides, top, front, back or bottom surfaces. The media bay 378 may be configured to receive any surface of a media player 379 so long as a connection is made between the media player 379 and the docking station 372. For example, it may be configured to receive the back of the media player as shown in FIG. 3 or it may be configured to receive the bottom of the media player as shown in FIG. 4. In the illustrated embodiment, the media bay 378 is configured to receive the back side of the media player 379. In some cases, the user interface of the media player 379 may be the primary user interface of the sound system 370 and in other cases, the user interface is secondary to a user interface of the sound system 370.

Figure 13:
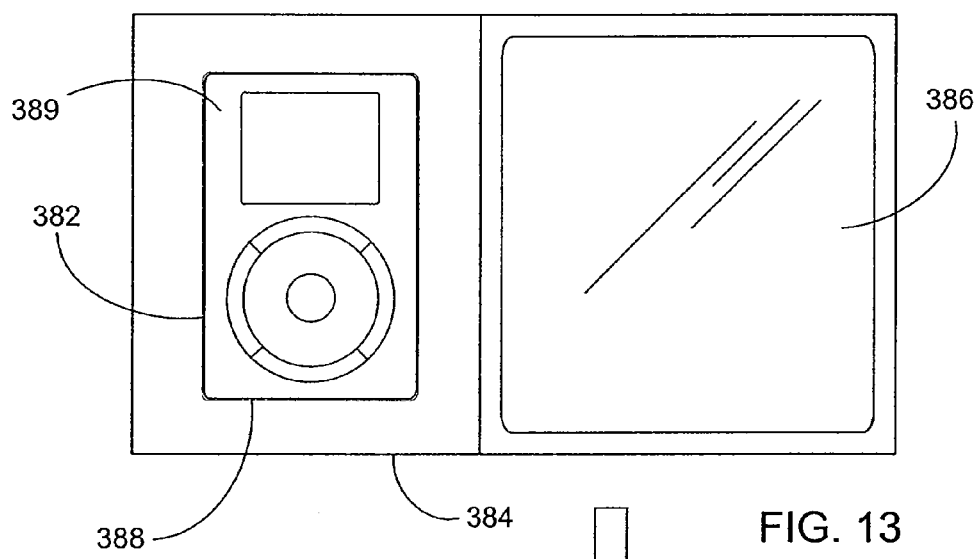
FIG. 13 is a diagram of a photo frame with a built-in docking station, in accordance with another embodiment of the present invention.

FIG. 13 is a photo display 380 with an integrated docking station 382, in accordance with one embodiment of the present invention. The photo display 380 is configured to showcase one or more images. For example, the photo display may be set on a desk or placed on a wall to display one or more family photos in a controlled manner. The photo display 380 generally includes a base 384 and a display 386 that is disposed in the base 384. The docking station 382 is integrated within the base 384. The docking station 382 includes a media bay 388 that may be placed anywhere on the base 384, as for example, the sides, top, front, back or bottom surfaces. The media bay 388 may be configured to receive any surface of a media player 389 so long as a connection is made between the media player 389 and the docking station 382. For example, it may be configured to receive the back of the media player as shown in FIG. 3 or it may be configured to receive the bottom of the media player as shown in FIG. 4. In the illustrated embodiment, the media bay 388 is configured to receive the back side of the media player 389. In some cases, the user interface of the media player 389 may be the primary user interface of the photo display system and in other cases, the user interface is secondary to a user interface of the photo display system.

Figure 14:
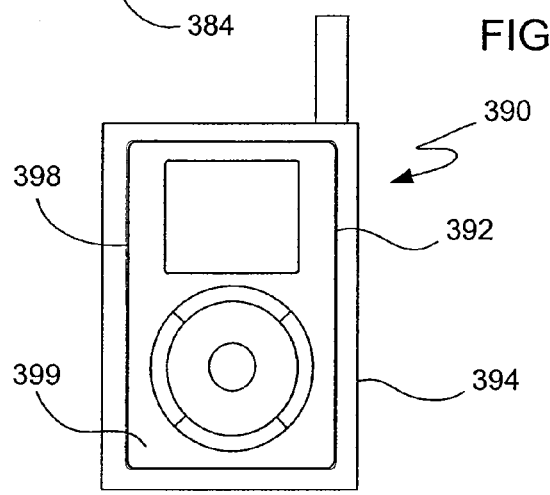
FIG. 14 is a diagram of a family radio with a built-in docking station, in accordance with another embodiment of the present invention.

FIG. 14 is a mobile radio 390 with an integrated docking station 392, in accordance with one embodiment of the present invention. The mobile radio allows a user to connect to other users in a local area, as for example when two parties are outdoors in different locations. For example, the mobile radio may provide voice communications, messaging (pager, email), digital one way radio (one to one and group), digital two way radio (one to one and group), data services (wireless web and private networks). In one embodiment, the mobile radio 390 allows a media player 399 to act as a mobile broadcasting station. For example, the user may broadcast music from the media player 399 to other media devices in a local area or within a local network. The mobile radio 390 generally includes a base 394 that includes the radio broadcast components (e.g., antenna, transmitter, receiver, volume controls, squelch controls, frequency controls, etc.).

The docking station 392 is integrated within the base 394. The docking station 392 includes a media bay 398 that may be placed anywhere on the base, as for example, the sides, top, front, back or bottom surfaces. The media bay 398 may be configured to receive any surface of the media player 399 so long as a connection is made between the media player 399 and the docking station 392. For example, it may be configured to receive the back of the media player as shown in FIG. 3 or it may be configured to receive the bottom of the media player as shown in FIG. 4. In the illustrated embodiment, the media bay 398 is configured to receive the back side of the media player 399 so that the user interface is exposed to the user. As such, the user may select a song and thereafter broadcast it to other users in the network.

Although the mobile radio and media device are shown as separate devices, it should be noted that they may be integrated thus eliminating the need for a docking station. For example, the radio broadcasting components such as receivers, transmitters, microphones, speakers and the like may be built into the media player as for example the media player shown in FIG. 1. The radio broadcasting components may be widely varied. For example, they may be associated with technologies including FM, RF, Bluetooth, 802.11 UWB (ultra wide band), IR, magnetic link (induction) and/or the like.

Figure 15:
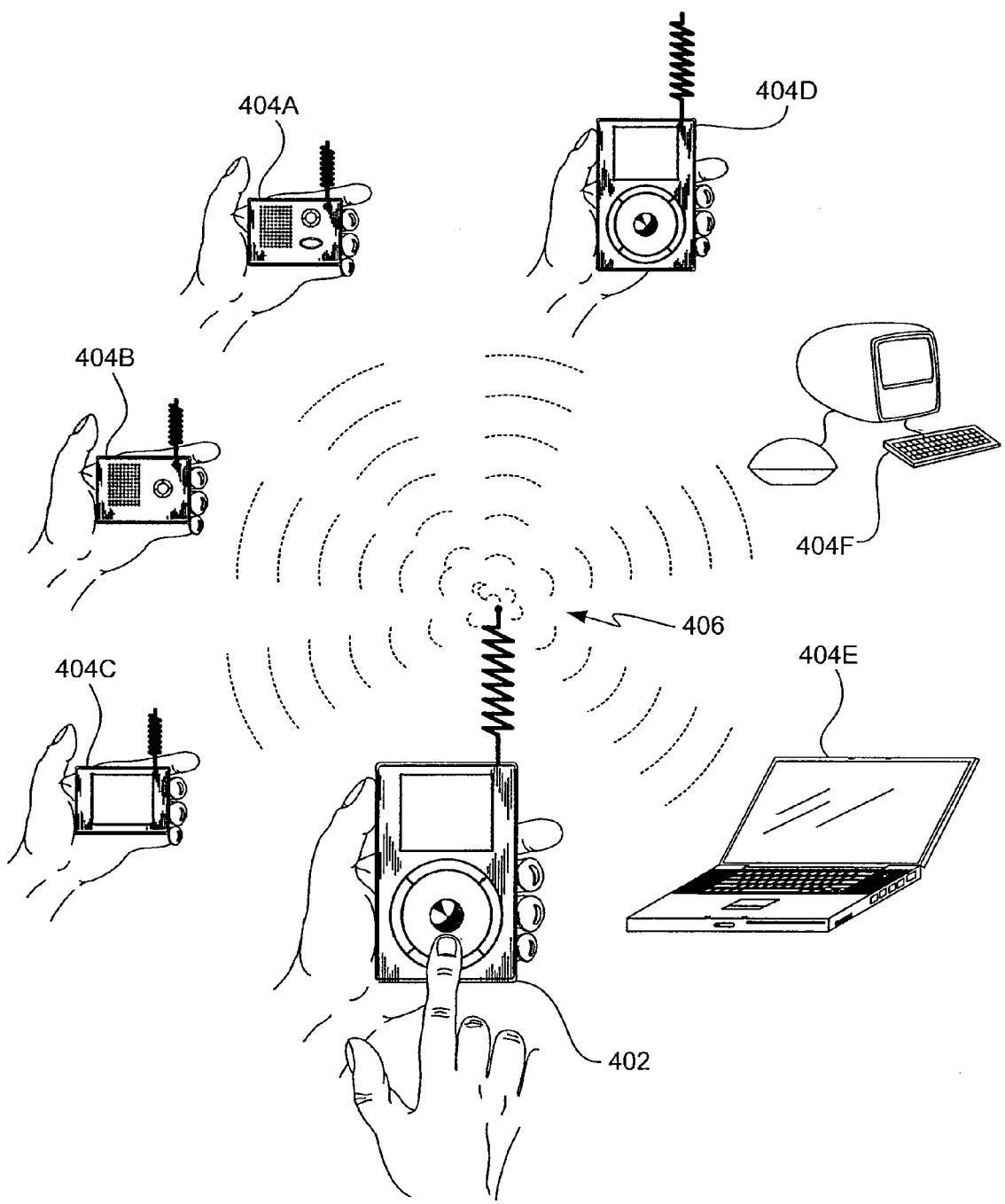
FIG. 15 is a diagram of a of a wireless communication system, in accordance with another embodiment of the present invention.

FIG. 15 is a diagram of a wireless communication system 400, in accordance with one embodiment of the present invention. The wireless communication system 400 generally includes a media player 402 and one or more media devices 404. The media player 402 is configured to send media via a wireless communication link 406 to the media devices 404 and the media devices 404 are configured to receive the media sent by the media player 402 over the wireless communication link 406. The media player is essentially configured to act as a personal transmitting station so that the user can transmit media stored on the media player to other devices. In some cases, the media devices 404 may also send media to the media player 402 and the media player 402 may also receive media from the media devices 404. By way of example, the media may generally correspond to audio, video, images, text and the like.

In order to send and receive media, the players and devices 402 and 404 generally include a transmitter, a receiver or a transceiver as well as some sort of antenna. The media is generally sent via the transmitter and the media is generally received via the receiver. In one embodiment, the media player includes a transmitter while the media devices include a receiver (for one way communications). In another embodiment, both devices include a transceiver (for two way communications). The antenna may be fully contained within the players/devices 402 and 404 or they may extend outside the devices (as shown). By way of example, the wireless communication link may correspond to FM, RF, Bluetooth, 802.11, UWB (ultra wide band), IR (infrared), magnetic link (induction) and/or the like.

The media player 402 may be widely varied. In the illustrated embodiment, the media player corresponds to the media player shown in FIG. 1. The media devices 404 may also be widely varied. These devices generally depend on the type of media being sent by the media player 402. By way of example, the media devices 404 may generally correspond to a personal mobile radio 404A, a personal tuning device 404B, a personal display device 404C, and the like. Personal generally refers to the fact that these devices pertain to a particular user. In one embodiment, these devices are handheld devices that are sized for placement into a pocket of the user. By being pocket sized, the user does not have to directly carry the device and therefore the device can be taken almost anywhere the user travels.

Personal mobile radios 404A generally include a microphone and speaker (or audio jack) so as to allow voice communications. The mobile radios may be based on push to talk (PTT) whereby pressing a button opens the communication line from the mobile radio to the media player. The mobile radios typically include an antenna such as a rugged rubber duck that consists of a coiled up element encased in rubber. The mobile radios may also include a channel tuner for selecting which channel to receive and send information, and a volume control dial for adjusting the volume of the audio signal. The mobile radios may also include a small display showing the selected channel, received signal strength, output power and the like. Mobile radios are generally well known and will not be described in greater detail.

Personal tuning devices 404B generally include a speaker (or headphone jack) and a volume control dial so as to listen to audio based media (e.g., music) being sent by the media player 402. The personal tuning devices may also include an antenna and a frequency tuner for selecting which channel to receive and send information. In one embodiment, the personal tuning device 404B corresponds to a radio (e.g., the media player may include an FM transmitter and the radio may include an FM receiver).

Personal display devices 404C generally include a display so as to view video or imaged based media being sent by the media player 402. In some cases, the personal display device 404C additionally includes speakers and volume control so that both photos/video and audio based media may be received from the media player. The video or photos may be produced by the media player through a camera located thereon. The video or photos may also be stored in a storage component located within the media player. In one embodiment, the personal display device corresponds to a television or TV (e.g., the media player may include a VHF or UHF transmitter and the TV may include a VHF or UHF receiver).

The media devices may also include a media player 404D, a notebook computer 404E or a general purpose computer 404F. The second media player 404D may be similar to the first media player 402 or it may be a different device altogether. By way of example, the second media player 404D may generally correspond to the media player shown in FIG. 1. Both the notebook computer 404E and the general purpose computer 404F may include the hardware necessary for communicating over the wireless communication link (e.g., antenna, receivers, transceivers) or they may be connected to a wireless hub 410 that includes the required hardware.

Figure 16:
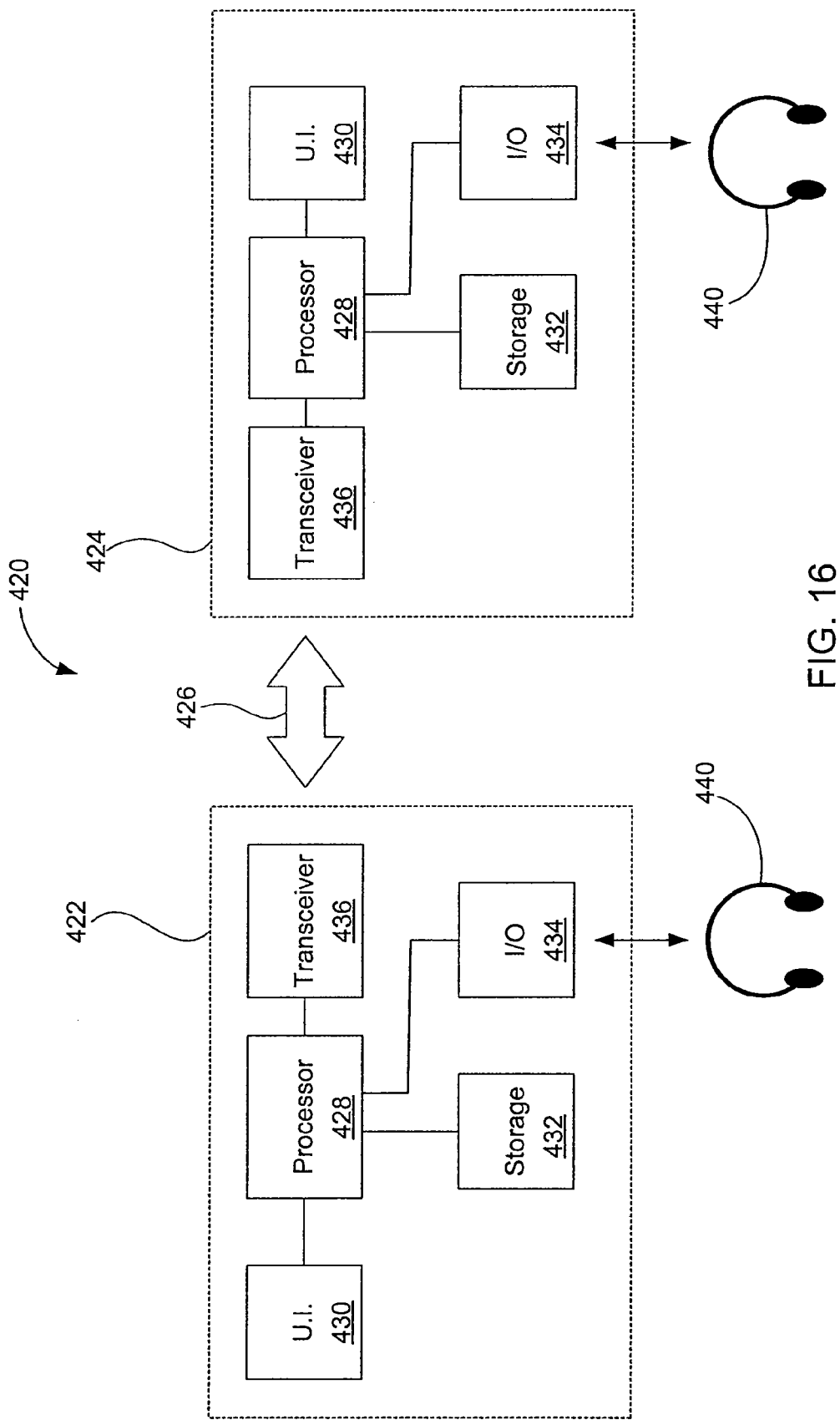
FIG. 16 is a block diagram of a of a wireless communication system, in accordance with another embodiment of the present invention.

FIG. 16 is a block diagram of a wireless communication system 420, in accordance with one embodiment of the present invention. The system 420 generally includes a media player 422 and a media device 424 that connect via a wireless communication link 426. Both the media player 422 and the media device 424 may be widely varied. For ease of discussion, the media device 424 corresponds to a second media player that is similar to the first media player. Both media players include a processor 428 that is operatively coupled to a user interface 430, a storage block 432, input/output circuitry 434 and a communication terminal 436.

The processor 428 is configured to execute instructions and to carry out operations associated with the media players 422, 424. For example, using instructions retrieved for example from memory, the processor 428 may control the reception and manipulation of input and output data between components of the media players 422, 424. In most cases, the processor 428 executes instruction under the control of an operating system or other software. The processor 428 can be a single-chip processor or can be implemented with multiple components.

The user interface 430 allows the user of the media players 422, 424 to initiate actions on the media players 422, 424 and provides the user with output associated with using the media players 422, 424 (e.g., audio, video, images, etc.). The user interface 430 may be widely varied. By way of example, the user interface 430 may include switches, buttons, keys, dials, trackballs, joysticks, touch pads, touch screens, displays, microphones, speakers, cameras, and the like.

The storage block 432 provides a place to hold data that is being used by the media players 422, 424. By way of example, the storage block 432 may include Read-Only Memory (ROM), Random-Access Memory (RAM), hard disk drive, flash memory and/or the like. In the illustrated embodiment, the storage block includes at least a hard drive.

The input/output (I/O) support circuitry 434 controls interactions with one or more I/O devices 440 that can be coupled to the media players 422, 424. The I/O support circuitry 434 may be integrated with the processor 428 or it may be a separate component (as shown). The I/O support circuitry 434 generally operates by exchanging data (and/or power) between the media players 422,424 and the I/O devices 440 that desire to communicate with the media players 422,424. In most cases, the I/O devices 440 may be connected to the I/O support circuitry 434 through one or more connectors, wires or cables. By way of example, the I/O devices 440 may be internal or peripheral devices such as other media players, notebook computers, personal digital assistants, general purpose computers, storage devices, additional user interfaces, audio equipment (e.g., speakers, headphones), video or imaging equipment (e.g., cameras), network cards, and the like. In the illustrated embodiment, the I/O device 440 corresponds to a head set. The head set may be connected to the media player through a headphone jack.

The communication terminal 436 controls interactions with one or more media devices 424 that can be coupled to the media player 422 through a wireless link. The communication terminal 436 may include a transmitter, receiver or transceiver. In one embodiment, the first media player 422 includes a transmitter and the second media player 424 includes a receiver thereby providing one way communication therebetween. In the illustrated embodiment, the first media player 422 includes a first transceiver and the second media player includes a second transceiver 424 for two way communication therebetween. The transmitter is configured to transmit information over the wireless communication link and the receiver is configured to receive information over the wireless communication link while the transceiver is configured to both transmit and receive information over the wireless communication link. The components of the receivers, transmitters and transceiver are generally well known within the technological filed from which they come (e.g., FM, RF, Bluetooth, 802.11 UWB, IR, magnetic link) and therefore they will not be described in greater detail.

Figure 17:
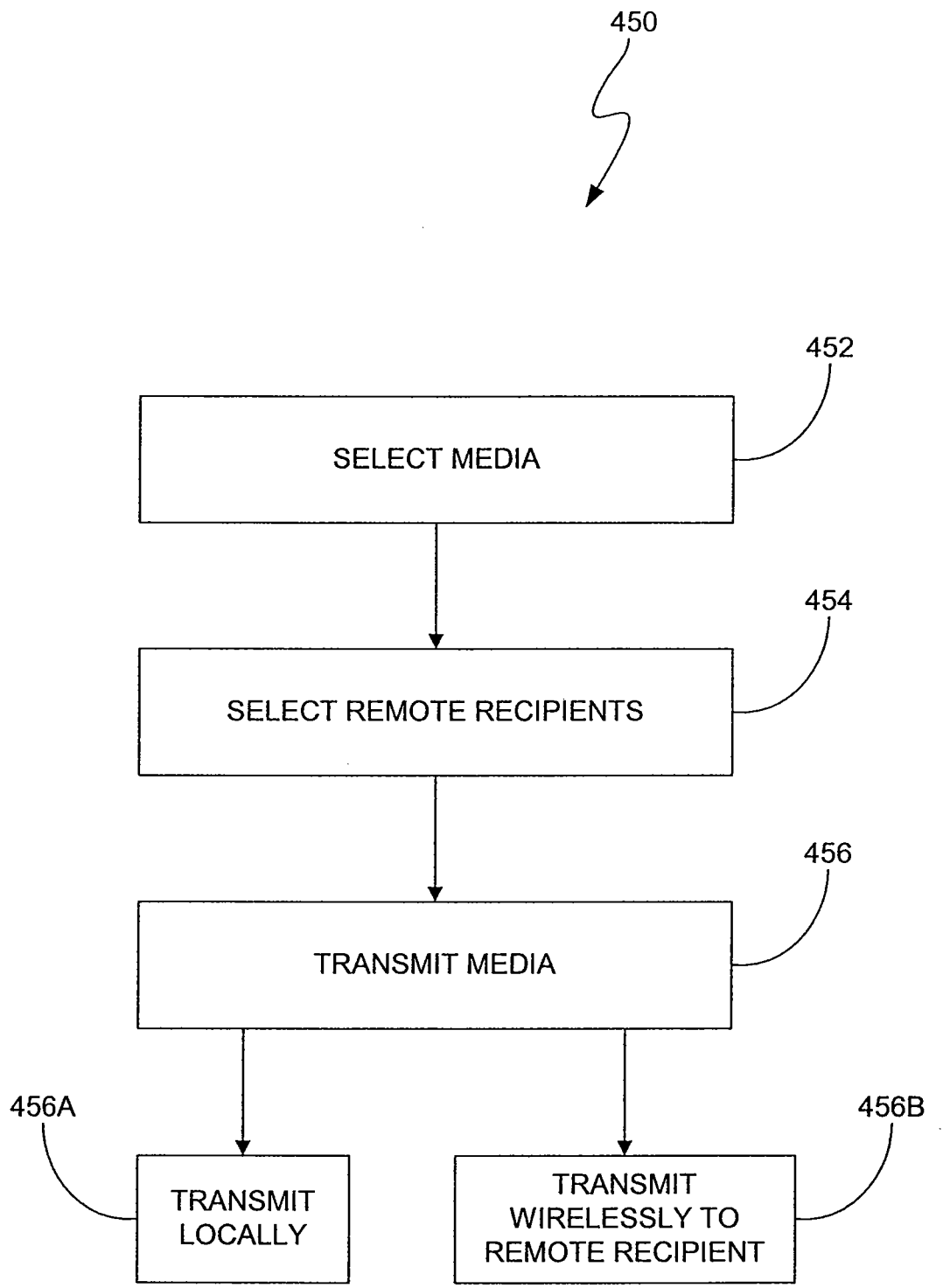
FIG. 17 is a flow diagram of a wireless transmission method, in accordance with one embodiment of the present invention

FIG. 17 is a flow diagram of a wireless transmission method 450, in accordance with one embodiment of the present invention. The method may be implemented by a media player, as for example the media player shown in FIG. 15 or 16. The method generally begins at block 452 where a media item is selected. This is generally accomplished by user operating the media player via the user interface of the media player. Depending on the application, the user may conveniently move through a list of media items and thereafter make a selection once the desired media item is found. In the case of music, the user may scroll through a list of songs until a desired song is found. In the case of images, the user may move through a proof sheet until a desired image is found.

Following block 452, the flow proceeds to block 454 where the remote recipients are selected. Remote recipients generally refer to other devices that are capable of receiving the selected media item from the media player. Selecting the remote recipients may include selecting a signal channel as for example in the case of a broadcast (e.g., FM) or selecting a desired address as for example in the case of a network connection (e.g., Bluetooth). In broadcasting, a media item is transmitted over airwaves for public reception by anyone with a receiver tuned to the right signal channel, i.e., the media item is cast or thrown in all directions at the same time. In networking, a media item is transmitted to one or more unique addresses, i.e., each media device has its own unique address. When utilizing broadcasting, the user may simply select a channel via the user interface of the media player. For example, the user of the media player may select FM 98.1 and therefore the user of the media device must select FM 98.1 in order to receive the media item. When utilizing networking, the user may select one or more addresses via the user interface of the media player. For example, the user may enter one or more unique address directly or the user may select one or more unique addresses from a preexisting group stored in the media player. In some cases, the unique addresses may be stored as a buddy list.

Following block 454, the flow proceeds to block 456 where the media item(s) is transmitted. The media item may be transmitted locally to the media player and/or it may be transmitted wirelessly to the remote recipient. In most cases, the media item is transmitted to both the media player as well as to the remote recipients.

The various aspects of the method described above can be used alone or in various combinations. The method is preferably implemented by a combination of hardware and software, but can also be implemented in hardware or software. The method can also be embodied as computer readable code on a computer readable medium. The computer readable medium is any data storage device that can store data which can thereafter be read by a computer system. Examples of the computer readable medium include read-only memory, random-access memory, hard drive, flash memory, CD-ROMs, DVDs, magnetic tape, optical data storage devices, and carrier waves.

Figure 18:
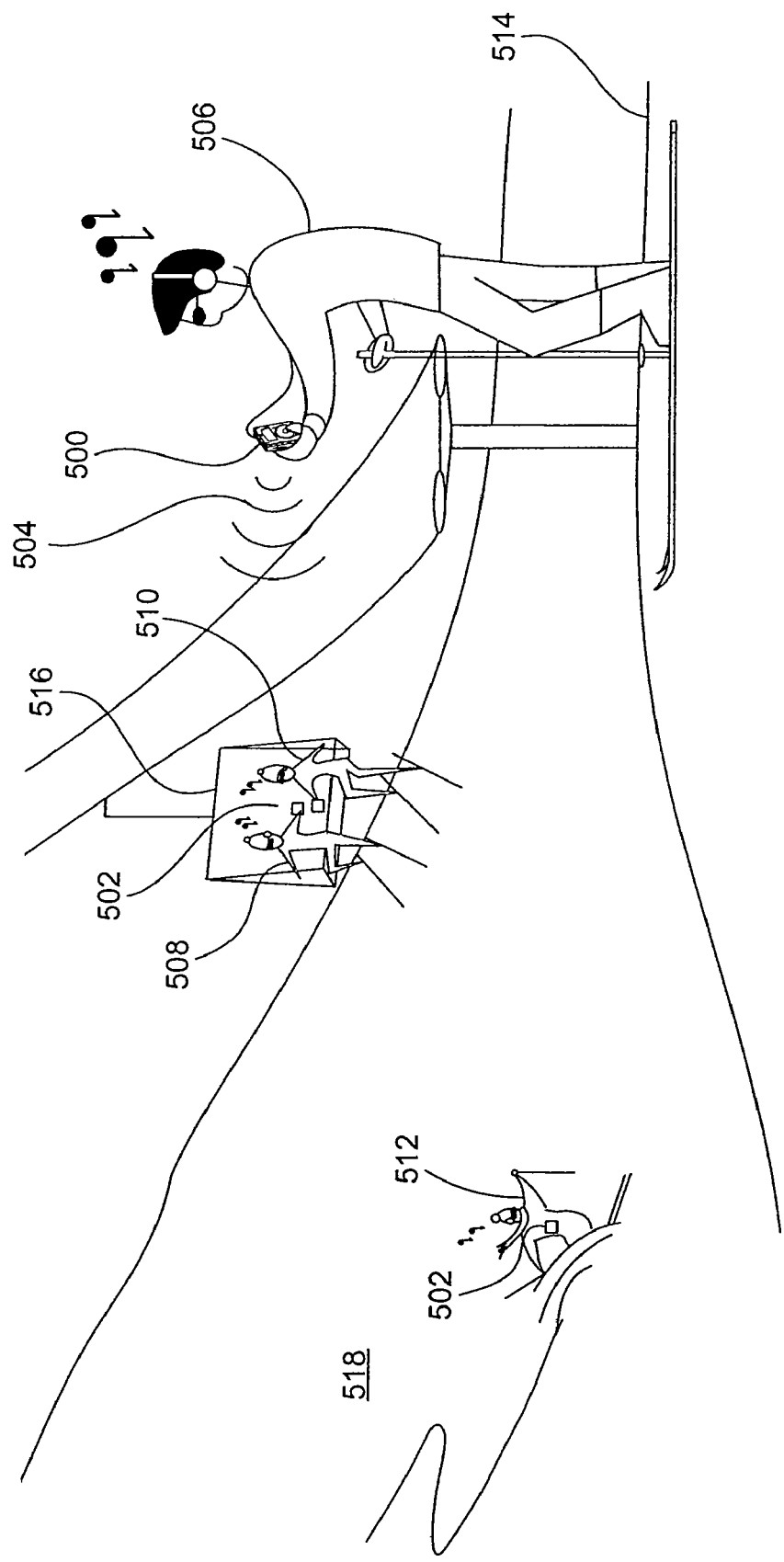
FIG. 18 is a perspective diagram of a wireless communication network in use, in accordance with another embodiment of the present invention.

FIG. 18 is an illustration showing a personal transmitting station 500 in use, in accordance with one embodiment of the present invention. By way of example, the personal transmitting station 500 may correspond to the media player shown in FIG. 1. The personal transmitting station 500 is wirelessly connected to one or more personal media devices 502 through one or more wireless links 504. These devices 500 and 502 are connected via a wireless communication signal such as any of those previously described.

Although the personal transmitting station 500 may be configured to transmit several types of data to the personal media devices 502, in the illustrated embodiment, the personal transmitting station 500 is configured to transmit audio data in the form of music 502 (e.g., the personal transmitting station includes MP3 functionality for example) to one or more personal media devices 502 acting as personal tuning devices. As such, the user of the personal transmitting station 500 can perform disc jockey functions, i.e., the user can determine what songs to be played on both the personal transmitting station 500 as well as the personal tuning devices 502.

In this particular illustration, a first skier 506 holds the personal transmitting station 500 while second, third and fourth skiers 508, 510 and 512 each hold personal tuning devices 502. As shown, the first skier 506 is located away from the second, third and fourth skiers 508, 510 and 512. The first skier 506 is located on a first hill 514, the second and third skiers 508 and 510 are located on a ski lift 516, and the fourth skier 502 is skiing down a second hill 518. As should be appreciated, all of these locations are within the broadcasting or networking range of the personal transmitting station 500.

The personal transmitting station 500 is configured to send a music signal to the personal tuning devices 502 held by the second, third and fourth skiers 508, 510 and 512 and the personal tuning devices 502 are configured to receive the music signal sent from the personal transmitting station 500. The first skier 506 can therefore effect changes to what is being listened to by the second, third and fourth skiers 508, 510 and 512 by simply selecting a different song to be played on the personal transmitting station 500 (even though he is in a different location than the rest of the skiers). For example, the first skier 506 may end a first song and select a second song to be played therefore causing the personal transmitting station 500 to send the second song to the personal tuning devices 502.

Both the personal transmitting station 500 as well as the personal tuning devices 502 include a means for outputting sound. For example, they may contain speakers or jacks for coupling to headphones. These devices may also include a means for adjusting the volume. For example, they may contain dials or buttons for increasing or decreasing the volume. In some cases, the personal tuning devices may include a means for making song requests, i.e., text messaging or voice communications.

While this invention has been described in terms of several preferred embodiments, there are alterations, permutations, and equivalents, which fall within the scope of this invention. For example, although the invention has been described in terms of an MP3 music player, it should be appreciated that certain features of the invention may also be applied to other types of media players such as video recorders, cameras, and the like. Furthermore, the MP3 music player described herein is not limited to the MP3 music format. Other audio formats such as MP3 VBR (variable bit rate), AIFF and WAV formats may be used. Moreover, certain aspects of the invention are not limited to handheld devices. For example, the touch pad may also be used in other computing devices such as a portable computer, personal digital assistants (PDA), cellular phones, and the like. The touch pad may also be used a stand alone input device that connects to a desktop or portable computer. It should also be noted that there are many alternative ways of implementing the methods and apparatuses of the present invention. For example, although the touch pad has been described in terms of being actuated by a finger, it should be noted that other objects may be used to actuate it in some cases. For example, a stylus or other object may be used in some configurations of the touch pad. It is therefore intended that the following appended claims be interpreted as including all such alterations, permutations, and equivalents as fall within the true spirit and scope of the present invention.

What is claimed is:

1. A docking station for receiving a media player that has a receptacle connector, the docking station comprising:
    a housing; and
    a media bay comprising a media bay opening and a male plug connector, wherein the media bay opening is formed in the housing and adapted to receive the media player, and
    wherein the male plug connector is disposed in the media bay opening and configured to engage the receptacle connector of the media player, the male plug connector including:
        a connector housing designed to accommodate at least 30 contacts spaced apart in a single row of sequentially numbered contact locations, wherein the sequentially numbered contact locations include:
            Firewire contact locations 3, 5, 7 and 9 designated for Firewire signals;
            universal serial bus (USB) contact locations 4, 6, and 8 designated for USB signals;
            an accessory identify contact location 10 designated for an accessory identify signal that has an associated electrical pull down function to notify the media player of an accessory identification;
            serial protocol contact locations 18 and 19 designated for serial protocol signals;
            audio contact locations 27 and 28 designated for analog audio signals; and
            ground contact locations 1 and 30 designated for ground.

2. The docking station of claim 1, wherein the male plug connector is sloped such that the media player rests in a tilted position when inserted in the media bay opening.

3. The docking station of claim 2, wherein an angle of the tilted position is in a range from about 5 degrees to about 25 degrees.

4. The docking station of claim 1, further comprising a ballast disposed in the housing to enable the docking station to support the media player.

5. The docking station of claim 1, further comprising one or more additional connectors operatively coupled to the male plug connector, at least one of the additional connectors being configured to allow signal transmission for communication with other electronic devices.

6. The docking station of claim 5, wherein the one or more additional connectors include at least one of an audio out connector or a multi-contact connector having a same contact location arrangement as the receptacle connector of the media player.

7. The docking station of claim 5, further comprising a flex cable disposed in the housing, the flex cable being configured to operatively couple the male plug connector to the one or more additional connectors, and wherein the one or more additional connectors are positioned on one or more printed circuit boards that are attached to the housing.

8. The docking station of claim 1, wherein the docking station is a media system and includes one or more features selected from a group consisting of a pair of speakers, a display, and radio broadcast components.

9. The docking station of claim 1, wherein the sequentially numbered contact locations further include a ground contact location 16 designated for ground.

10. The docking station of claim 9, wherein the sequentially numbered contact locations further include additional ground contact locations 2, 15, and 29 designated for ground.

11. The docking station of claim 1, wherein the sequentially numbered contact locations further include:

an accessory power contact location 13 designated for an accessory power signal that can receive power from the media player; and an accessory detect contact location 20 designated for an accessory detect signal.

12. The docking station of claim 1, further comprising:
Firewire contacts disposed at contact locations 3, 5, 7 and 9 and appropriated for carrying the Firewire signals;
USB contacts disposed at contact locations 4, 6, and 8 and appropriated for carrying the USB signals;
an accessory identify contact disposed at contact location 10 and appropriated for carrying the accessory identify signal;
serial protocol contacts disposed at contact locations 18 and 19 and appropriated for carrying the serial protocol signals;
audio contacts disposed at contact locations 27 and 28 and appropriated for carrying the analog audio signals; and
ground contacts disposed at contact locations 1 and 30 and appropriated for ground, wherein at least a subset of the contacts can be active when the male plug connector is connected to the corresponding receptacle connector of the media player.

13. The docking station of claim 12, wherein the connector housing is made of plastic;
wherein the contacts are made of an electrically conductive material, are disposed in a corresponding one of the sequentially numbered contact locations for the at least 30 contacts, and are recessed inside the connector housing in an off-center position; and
wherein at least one contact is made of a copper alloy.

14. The docking station of claim 1, further comprising power contacts appropriated to carry power and located at locations 11 and 12.

15. A docking station for receiving a media player that has a receptacle connector, the docking station comprising: a housing; and a media bay comprising a media bay opening and a male plug connector, wherein the media bay opening is formed in the housing and adapted to receive the media player, and wherein the male plug connector is disposed in the media bay opening and configured to engage the receptacle connector of the media player, the male plug connector including: a connector housing designed to accommodate at least 30 contacts spaced apart in a single row of sequentially numbered contact locations, wherein the sequentially numbered contact locations include: digital contact locations 3 to 9 designated for digital signals including universal serial bus (USB) contact locations designated for USB data signals interleaved with contact locations designated for digital signals other than USB data signals; analog contact locations 27 and 28 designated for one or more analog signals including at least one audio signal; and ground contact locations 1 and 30 designated for ground.

16. The docking station of claim 15, wherein the sequentially numbered contact locations further include a ground contact location 16 designated for ground.

17. The docking station of claim 16, wherein the sequentially numbered contact locations further include ground contact locations 2, 15, and 29 designated for ground.

18. The docking station of claim 15, further comprising:
digital contacts disposed at contact locations 3 to 9 and appropriated for carrying the digital signals;
analog contacts disposed at contact locations 27 and 28 and appropriated for carrying the analog signals; and
ground contacts disposed at contact locations 1 and 30 and appropriated for ground, wherein at least a subset of the plurality of contacts can be active when the male plug connector is connected to the corresponding receptacle connector of the media player.

19. The docking station of claim 15, wherein the sequentially numbered contact locations further include an accessory identify contact location 10 designated for an accessory identify signal that has an associated electrical pull down function to notify the media player of an accessory identification.

20. The docking station of claim 15, wherein the sequentially numbered contact locations further include:
an accessory power contact location 13 designated for an accessory power signal that can receive power from the media player; and
an accessory detect contact location 20 designated for an accessory detect signal.

21. The docking station of claim 15, wherein the sequentially numbered contact locations further include:
serial protocol contact locations 18 and 19 designated for serial protocol signals.

22. The docking station of claim 15, wherein contact locations 3, 5, 7 and 9 are designated for Firewire signals.

23. The docking station of claim 15, wherein locations 4, 6, and 8 are designated for USB signals.

24. The docking station of claim 15, further comprising power contacts appropriated to carry power and located at locations 11 and 12.

25. A docking station for receiving a media player that has a receptacle connector, the docking station comprising:
a housing; and
a media bay comprising a media bay opening and a male plug connector, wherein the media bay opening is formed in the housing and adapted to receive the media player, and
wherein the male plug connector is disposed in the media bay opening and configured to engage the receptacle connector of the media player, the male plug connector including:
a connector housing designed to accommodate a plurality of contacts spaced apart in a single row of contact locations, wherein the contact locations are sequentially numbered from a first end to a second end, the contact locations including:
a first ground contact location designated for ground;
a first group of digital contact locations designated for one or more digital signals including universal serial bus (USB), the first group of digital contact locations being disposed between the first ground contact location and the first end, wherein the contact locations from the first group of digital contact locations that are designated for USB are disposed consecutively in every other contact location; and
a second group of analog contact locations designated for one or more analog signals including at least one audio signal, the second group of analog contact locations being disposed between the first ground contact location and the second end.

26. The docking station of claim 25, wherein the sequentially numbered contact locations further include:
a second ground contact location at the first end and designated for ground; and
a third ground contact location at the second end and designated for ground.

27. The docking station of claim 25, wherein contact locations from the first group of digital contact locations that are designated for USB are interleaved with contact locations designated for Firewire signals.

28. The docking station of claim 26, wherein the plurality of contact locations comprises 30 sequentially numbered contact locations, and wherein the first ground contact location is at contact location 16, the second ground contact location is at contact location 1, and the third ground contact location is at contact location 30, and wherein the sequentially numbered contact locations further include additional ground contact locations 2, 15, and 29 designated for ground.

29. The docking station of claim 28, wherein the first group of digital contact locations comprises locations 3 to 9, and wherein the second group of analog contact locations comprises locations 27 and 28.

30. The docking station of claim 29, wherein the first group of digital contact locations includes locations 3, 5, 7 and 9 designated for Firewire signals.

31. The docking station of claim 29, wherein the first group of digital contact locations includes locations 4, 6, and 8 designated for USB signals.

32. The docking station of claim 29, further comprising a plurality of contacts made of electrically conductive material disposed at the plurality of contact locations, respectively, wherein at least a subset of the plurality of contacts can be active when the male plug connector is connected to the corresponding receptacle connector of the media player.

33. The docking station of claim 28, further comprising one or more power contacts made of electrically conductive material disposed in one or more of contact locations 8, 11 or 12.

34. The docking station of claim 28, wherein the contact locations further include an accessory identify contact location 10 designated for an accessory identify signal that has an associated electrical pull down function to notify the media player of an accessory identification.

35. The docking station of claim 28, wherein the contact locations further include:
an accessory power contact location 13 designated for an accessory power signal that can receive power from the media player; and
an accessory detect contact location 20 designated for an accessory detect signal.

36. The docking station of claim 28, wherein the contact locations further include serial protocol contact locations 18 and 19 designated for serial protocol signals.

37. The docking station of claim 31 wherein contact location 8 is designated for a USB power signal.

38. A docking station for receiving a media player that has a receptacle connector, the docking station comprising:
a housing; and
a media bay comprising a media bay opening and a male plug connector, wherein the media bay opening is formed in the housing and adapted to receive the media player, and
wherein the male plug connector is disposed in the media bay opening and configured to engage the receptacle connector of the media player, the male plug connector including:
a connector housing designed to accommodate a plurality of contacts spaced apart in a single row of contact locations, wherein the contact locations comprise thirty contact locations sequentially numbered from a first end to a second end, the contact locations including:
first, second and third ground contact locations designated for ground, the first ground contact location being disposed at contact location 1 at the first end, the third ground contact location being disposed at contact location 30 at the second end and the second ground contact location being disposed at one of contact locations 15 or 16 between the first and second ends;
a group of digital contact locations designated for one or more digital signals including universal serial bus (USB) signals, the group of digital contact locations being disposed between the first and second ground contact locations;
a group of analog contact locations designated for one or more analog signals including an audio left signal and an audio right signal, the group of analog contact locations being disposed between the second and third ground contact locations; and
a group of power contact locations designated for one or more power signals including USB power, accessory power and charger input power, the group of power contact locations being disposed between the first and second ground contact locations.

39. The docking station of claim 38 wherein the sequentially numbered contact locations further include fourth and fifth ground contact locations designated for ground, the fourth ground contact location being disposed at contact location 2 and the fifth ground contact location being disposed adjacent to the second ground contact location at the other of contact locations 15 or 16.

40. The docking station of claim 39 wherein the group of analog contact locations includes an audio out left contact location at contact location 27 and an audio out right contact location at contact location 28.

41. The docking station of claim 39 wherein contact location 8 is designated for a USB power signal.

42. The docking station of claim 39 wherein the contact locations further include an accessory identify contact location designated for an accessory identify signal that has an associated electrical pull down function to notify the media player of an accessory identification, the accessory identify contact location being located between the first and second ground contact locations.

43. The docking station of claim 39 wherein the contact locations further include an accessory detect contact location designated for an accessory detect signal.

44. The docking station of claim 39 wherein the contact locations further include first and second serial protocol contact locations designated for serial protocol signals.

* * * * *